US012318797B2

(12) United States Patent
Numata et al.

(10) Patent No.: US 12,318,797 B2
(45) Date of Patent: Jun. 3, 2025

(54) NOZZLE FOR BLOWER

(71) Applicant: MAKITA CORPORATION, Anjo (JP)

(72) Inventors: Fumitoshi Numata, Anjo (JP); Kanako Hirono, Anjo (JP)

(73) Assignee: MAKITA CORPORATION, Anjo (JP)

( * ) Notice: Subject to any disclaimer, the term of this patent is extended or adjusted under 35 U.S.C. 154(b) by 654 days.

(21) Appl. No.: 17/465,324

(22) Filed: Sep. 2, 2021

(65) Prior Publication Data

US 2022/0097093 A1 Mar. 31, 2022

(30) Foreign Application Priority Data

Sep. 30, 2020 (JP) ................................ 2020-166349
Jun. 4, 2021 (JP) ................................ 2021-094030

(51) Int. Cl.
*B05B 15/62* (2018.01)
*B05B 15/652* (2018.01)

(52) U.S. Cl.
CPC .................................. *B05B 15/652* (2018.02)

(58) Field of Classification Search
CPC .............................. B05B 1/005; B05B 15/652
USPC ................. 239/587.1, 588, DIG. 21, DIG. 2; 406/154, 164, 194, 196
See application file for complete search history.

(56) References Cited

U.S. PATENT DOCUMENTS 2,568,039 A * 9/1951 Torell ...................... B60S 3/044 239/588
4,848,007 A 7/1989 Montagnino
5,157,757 A 10/1992 McDougall
5,287,635 A 2/1994 Chan
5,584,436 A * 12/1996 Sepke .................... A47L 9/244 239/588
9,675,158 B2 6/2017 Soresina et al.
D800,385 S 10/2017 Porter
D927,780 S 8/2021 Carlucci
2002/0157209 A1 10/2002 Marshall et al.
2011/0307039 A1 12/2011 Cornell
2015/0373921 A1 12/2015 DeSanti
2017/0127804 A1 5/2017 Lee
2017/0245614 A1 8/2017 Porter
2017/0273425 A1 9/2017 Stephens et al.
2018/0140070 A1 5/2018 Hillebrecht et al.
2018/0184779 A1 7/2018 Torres et al.
(Continued)

FOREIGN PATENT DOCUMENTS

JP 2011-117442 A 6/2011
JP 2012-077817 A 4/2012
JP 2015-102062 A 6/2015

OTHER PUBLICATIONS

Mar. 22, 2023 Office Action issued in U.S. Appl. No. 17/464,770.
(Continued)

*Primary Examiner* — Steven J Ganey
(74) *Attorney, Agent, or Firm* — Oliff PLC

(57) ABSTRACT

A nozzle includes a mounting part that is configured to be attached to a blower, and a body part that is connected to the mounting part. The body part has a discharge opening and a passage for air blown out by the blower. The passage leads to the discharge opening. The body part includes a flexible tube. The flexible tube has a length of at least 15 cm and defines at least a portion of the passage.

19 Claims, 36 Drawing Sheets

(56) References Cited

U.S. PATENT DOCUMENTS

| | | | |
|---|---|---|---|
| 2019/0014879 | A1 | 1/2019 | deGrood et al. |
| 2019/0098979 | A1 | 4/2019 | Atkinson et al. |
| 2019/0104820 | A1 | 4/2019 | Williams |
| 2019/0290080 | A1* | 9/2019 | Liu ........................... B08B 5/02 |
| 2020/0121053 | A1 | 4/2020 | Dawkins |
| 2020/0181915 | A1* | 6/2020 | Lindl .................. E04D 13/0765 |
| 2021/0307472 | A1 | 10/2021 | Conrad |
| 2021/0330052 | A1 | 10/2021 | Lelieveld |
| 2022/0032439 | A1 | 2/2022 | Numata |
| 2022/0196035 | A1 | 6/2022 | Numata et al. |
| 2022/0305508 | A1 | 9/2022 | Numata |

OTHER PUBLICATIONS

Sep. 25, 2023 Notice Of Allowance issued in U.S. Appl. No. 17/464,770.
Jul. 3, 2023 Office Action Issued in U.S. Appl. No. 17/464,770.
Dec. 14, 2022 Office Action Issued in U.S. Appl. No. 17/464,770.
U.S. Appl. No. 17/464,770, filed Sep. 2, 2021 on the behalf of Fumitoshi Numata.
Oct. 1, 2024 Office Action issued in Japanese Application No. 2021-094030.
Apr. 21, 2025 Office Action issued in Chinese Application No. 202111107148.1.

* cited by examiner

NOZZLE FOR BLOWER

CROSS-REFERENCE TO RELATED APPLICATIONS

The present application claims priority to Japanese patent application Nos. 2020-166349 filed on Sep. 30, 2020, and 2021-094030 filed on Jun. 4, 2021. The contents of the foregoing applications are hereby fully incorporated herein by reference.

TECHNICAL FIELD

The present disclosure relates to a nozzle that is configured to be attached to an electric blower.

BACKGROUND

Electric blowers (air blowers) that are capable of blowing off grit, dust etc. by discharging air from a nozzle are known. For example, Japanese Unexamined Patent Application Publication No. 2011-117442 discloses a blower (a so-called air duster) that is configured to generate compressed air and discharge the compressed air from a nozzle, using centrifugal fans rotated by a motor. Nozzles that are different in diameter and/or length can be selectively attached to this air duster as necessary.

SUMMARY

It is an object of the present disclosure to provide a nozzle that is removably attachable to an electric blower and that can improve convenience of the blower.

A first aspect of the present disclosure herein provide a nozzle that is configured to be attached (connected, coupled, mounted) to an electric blower. The nozzle includes a mounting part and a body part. The mounting part is configured to be attached to the blower. The body part is connected to the mounting part. The body part has a discharge opening and a passage for air blown out by the blower. The passage leads to the discharge opening. The body part includes a flexible tube that has a length of at least 15 centimeters (cm) and defines at least a portion of the passage.

According to this aspect, a user can bend the flexible tube and thus relatively freely change a position and orientation of the discharge opening relative to the blower. Further, the flexible tube has a length of at least 15 cm, so that the user can change the position and orientation of the discharge opening within a relatively wide range. Therefore, when the nozzle according to this aspect is attached to the blower, the user can change a target position to which the air is blown, within a relatively wide range, by deforming the flexible tube without need of moving the blower. Thus, the nozzle according to this aspect can improve convenience of the blower.

A second aspect of the present disclosure herein provides a nozzle that is configured to be attached to an electric blower. The nozzle includes a mounting part and a body part. The mounting part is configured to be attached to the blower. The body part protrudes from the mounting part and has a plurality of discharge openings. According to this aspect, the nozzle is provided that is attachable to the blower and that can discharge air from the discharge openings to a relatively wide range. The nozzle according to this aspect can thus improve convenience of the blower.

A third aspect of the present disclosure herein provides a nozzle that is configured to be attached to an electric blower. The nozzle includes a plurality of tubular members that are removably coupled (connected) to each other. At least two of the tubular members are threadedly engaged with each other. According to this aspect, a length of the nozzle in a flowing direction of air can be shortened by removing at least one of the tubular members. Thus, a user can change the length of the nozzle, depending on the actual usage. The nozzle according to this aspect can thus improve convenience of the blower. Further, at least two of the tubular members are connected with each other by threaded engagement. Thus, the air does not easily leak through the connection between the at least two tubular members of the nozzle, and even if an external force is applied to the nozzle, the positional relationship between the at least two tubular members does not easily change.

DETAILED DESCRIPTION OF THE EMBODIMENTS

Figure 1:
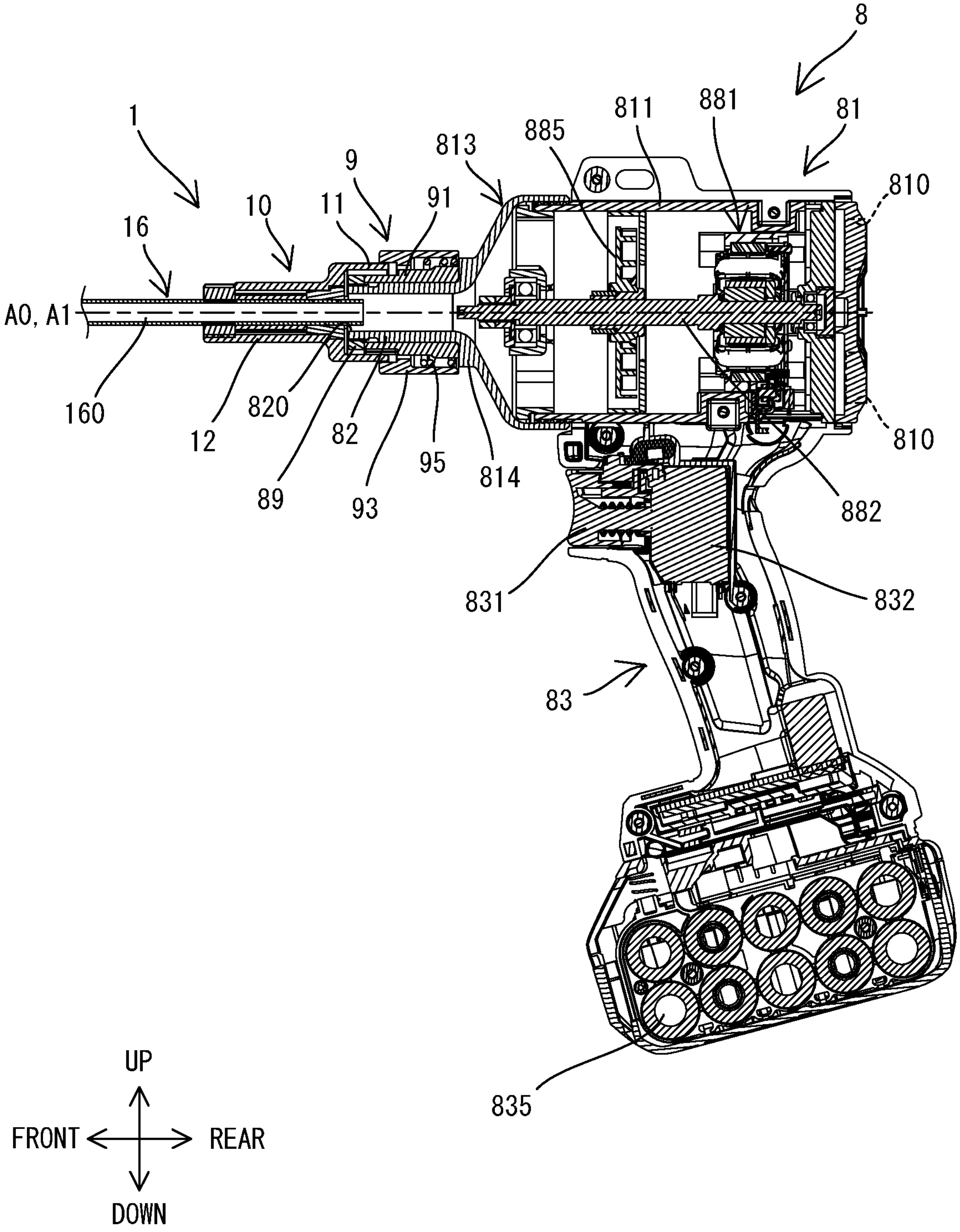
FIG. 1 is a sectional view of an air duster.

In one non-limiting embodiment of the first aspect of the present disclosure, the flexible tube may be couped (connected) to the mounting part such that the flexible tube is prevented from coming off from the mounting part in a flowing direction of the air. According to this embodiment, the flexible tube can be prevented from coming off from the mounting part due to discharge of the air.

In addition or in the alternative to the preceding embodiment, the nozzle may further include a cover that at least partially covers the flexible tube. The cover may be formed of a material having higher rigidity than the flexible tube. The cover may be removably coupled (connected, attached, mounted, fitted) to the flexible tube. According to this embodiment, a user can couple the cover to the flexible tube as necessary, and manipulate the flexible tube while at least a portion of the flexible tube is kept substantially unbendable owing to the cover. Thus, operability (maneuverability) of the flexible tube can be enhanced.

In addition or in the alternative to the preceding embodiments, the body part may have at least one vent hole (at least one vent opening) disposed radially outward of the flexible tube. In other words, the body part may have at least one vent hole, aside from the discharge opening. According to this embodiment, even when a flow rate of the air discharged only from the discharge opening is relatively small, the air also flows out via the at least one vent hole, so that a total flow rate of the air discharged from the nozzle can be increased. Thus, the possibility of surge can be reduced.

In the preceding embodiment, the nozzle may further include a ventilation resistance member (an airflow resistance member) that is disposed in a vent passage leading to the at least one vent hole. According to this embodiment, the ventilation resistance member can reduce a flow velocity (wind velocity) of the air passing through the vent passage. Thus, the pressure of the air discharged from the at least one vent hole can be reduced, so that high-pressure air can be prevented from being blown from the at least one vent hole to a position that is different from a target position for blowing the air from the discharge opening.

In one non-limiting embodiment of the second aspect of the present disclosure, the plurality of discharge openings may be intersected by the same plane and oriented in different directions from each other. According to this embodiment, the nozzle is provided that is capable of blowing air to a relatively wide range, while suppressing a size increase of the nozzle in a direction that is orthogonal to the above-described plane.

In addition or in the alternative to the preceding embodiments, the mounting part of the nozzle may be configured to be locked in an attachment position, when the nozzle is moved in a first direction and placed in the attachment position relative to the blower, to be immovable in a second direction opposite to a first direction. According to this embodiment, the user can lock the mounting part to the blower simply by moving the nozzle in one direction (i.e., in the first direction) relative to the nozzle. Thus, the nozzle can be provided with excellent operability (maneuverability).

In one non-limiting embodiment of the third aspect of the present disclosure, the tubular members may at least include a first member and a second member. The first member may be configured to be attached to the blower. The second member may be removably coupled (connected) to the first member. A portion of the second member that is adjacent to the first member on a downstream side of the first member in a flowing direction of air may be configured to be more flexible (deflectable, bendable) than a remaining portion of the nozzle. In this embodiment, when an external force is applied to the nozzle, the portion of the second member that is adjacent to the first member can flex (deflect, bend), thereby reducing a load on the remaining portion of the nozzle and thus reducing the possibility of breakage of the nozzle.

First to sixth representative and non-limiting embodiments of the present disclosure are now specifically described with reference to the drawings.

First Embodiment

A nozzle 1 according to a first embodiment of the present disclosure is described with reference to FIGS. 1 to 21. The nozzle 1 is additionally attachable to a nozzle part 82 of an air duster 8 for use with the air duster 8. Various kinds of nozzles can be selectively attached to the nozzle part 82 of the air duster 8. A user can use the air duster 8 without a nozzle or with an appropriate nozzle attached thereto, depending on an operation to be performed. The nozzle 1 of this embodiment is an example of the nozzles that can be attached to the air duster 8.

The structure of the air duster 8 is first outlined.

The air duster 8 is an example of an electric blower (air blower). More specifically, the air duster 8 is a kind of blower (air blower) that is capable of blowing off grit, dust, etc. by discharging compressed air. As shown in FIG. 1, the air duster 8 includes a body housing 81 and a handle 83. A motor 881 and a centrifugal fan 885 are housed in the body housing 81. An output shaft 882 of the motor 881 and the centrifugal fan 885 are integrally driven around a rotational axis A0. The body housing 81 extends along the rotational axis A0. Openings (inlet openings) 810 for sucking air into the body housing 81 are formed in one axial end portion of the body housing 81. The nozzle part 82 is formed in the other axial end portion of the body housing 81. The nozzle part 82 has a hollow cylindrical shape centering on the rotational axis A0 and has an opening (discharge opening) 820 for discharging air from the body housing 81. The discharge opening 820 has a diameter of 13.0 mm. The handle 83 is configured to be held by a user. The handle 83 protrudes from the body housing 81 and extends in a direction that crosses the rotational axis A0.

In the following description, for convenience sake, the extending direction of the rotational axis A0 is defined as a front-rear direction of the air duster 8. In the front-rear direction, a direction from the inlet openings 810 toward the discharge opening 820 is defined as a forward direction, while the opposite direction (a direction from the discharge opening 820 toward the inlet openings 810) is defined as a rearward direction. A direction that is orthogonal to the rotational axis A0 and that generally corresponds to the extending direction of the handle 83 is defined as an up-down direction of the air duster 8. In the up-down direction, a direction in which the handle 83 protrudes from the body housing 81 (the direction from the body housing 81 toward a protruding end of the handle 83) is defined as a downward direction, while the opposite direction (a direction from the protruding end of the handle 83 toward the body housing 81) is defined as an upward direction. A direction that is orthogonal to both the front-rear direction and the up-down direction is defined as a left-right direction.

A trigger 831 is provided in an upper end portion of the handle 83. A switch 832 is housed within the handle 83. A battery 835 for supplying power to the motor 881 is removably coupled to a lower end portion of the handle 83. When the trigger 831 is depressed by the user, the switch 832 is turned on and the motor 881 is driven. The centrifugal fan 885 is then rotationally driven, so that air is sucked into the body housing 81 through the inlet openings 810. The air is compressed by the centrifugal fan 885 and discharged from the discharge opening 820. When the nozzle 1 is attached to the air duster 8, the air discharged from the discharge opening 820 passes through a passage 160 of the nozzle 1 and is discharged from a discharge opening 162 of the nozzle 1 (see FIG. 2).

The structure of the nozzle 1 is now described in detail.

Figure 2:
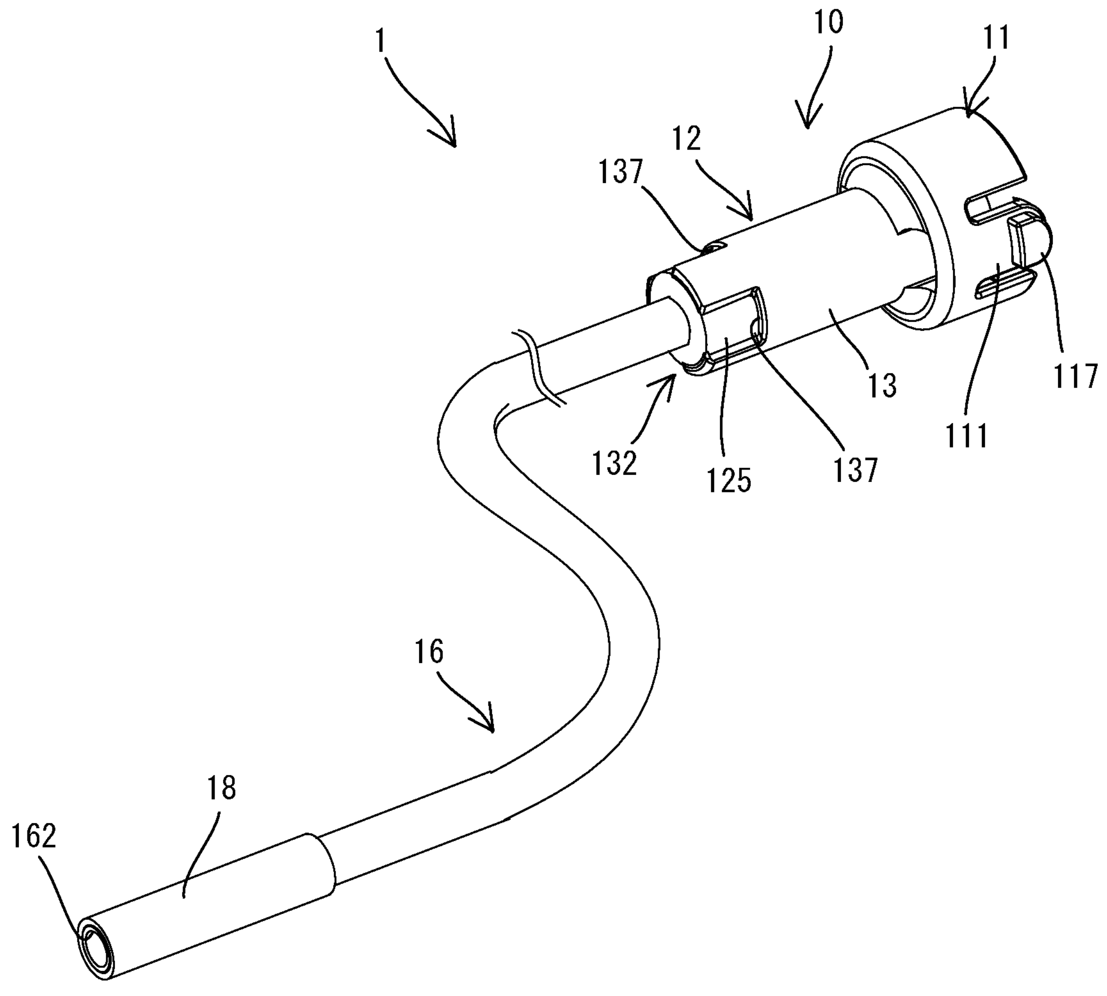
FIG. 2 is a perspective view of a nozzle.
Figure 3:
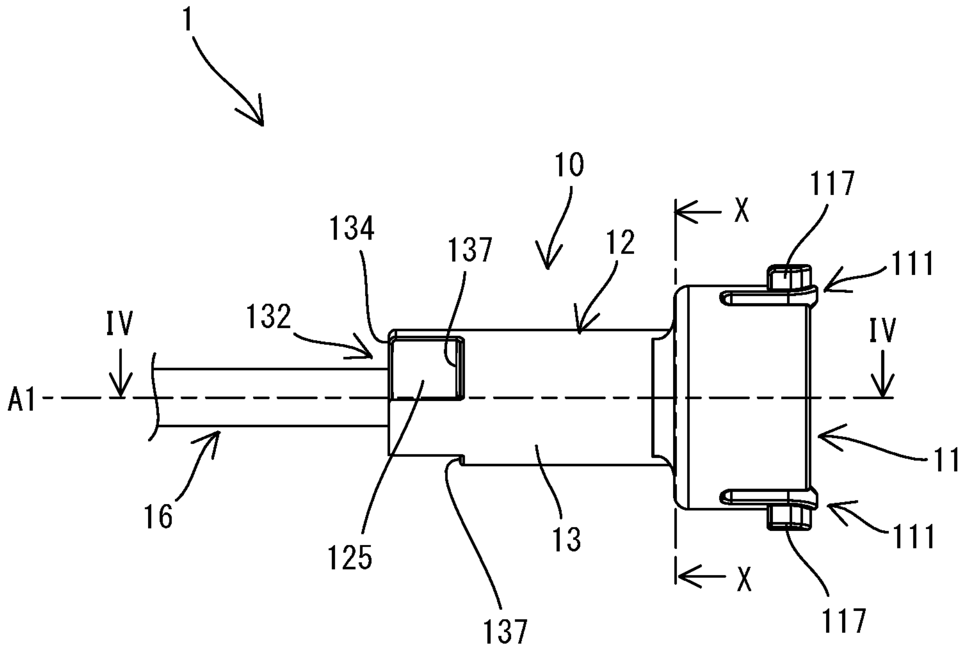
FIG. 3 is a side view of the nozzle.

As shown in FIG. 2, the nozzle 1 includes a base member 10 that is configured to be attached to the air duster 8, and a flexible tube 16 that is coupled (connected) to the base member 10.

The base member 10 is first described. As shown in FIGS. 1 to 4, the base member 10 is an elongate tubular member (hollow cylindrical member) that extends along an axis A1. The base member 10 includes a mounting part 11 and a holding part 12. In this embodiment, the mounting part 11 and the holding part 12 are integrally formed of synthetic resin (polymer). However, the mounting part 11 and the holding part 12 may be separately formed from each other and connected together. The mounting part 11 is configured to be attached to the nozzle part 82 (specifically, a lock mechanism 9, see FIG. 1) of the air duster 8. The holding part 12 protrudes from an axial end of the mounting part 11 in its axial direction. The holding part 12 engages with and holds the flexible tube 16. The holding part 12 forms a body part of the nozzle 1 together with the flexible tube 16.

In the following description, for convenience sake, the direction of the nozzle 1 is defined with reference to the orientation of the nozzle 1 attached to the air duster 8. The nozzle 1 is attached to the air duster 8 such that an axis A1 of the mounting part 11 coincides with the rotational axis A0. Thus, an extending direction of the axis A1 (an axial direction of the mounting part 11) is defined as a front-rear direction of the nozzle 1. In the front-rear direction, the side on which the mounting part 11 is located (the side to be connected to the air duster 8) is a rear side of the nozzle 1, and the side on which the holding part 12 is located is a front side of the nozzle 1.

Figure 5:
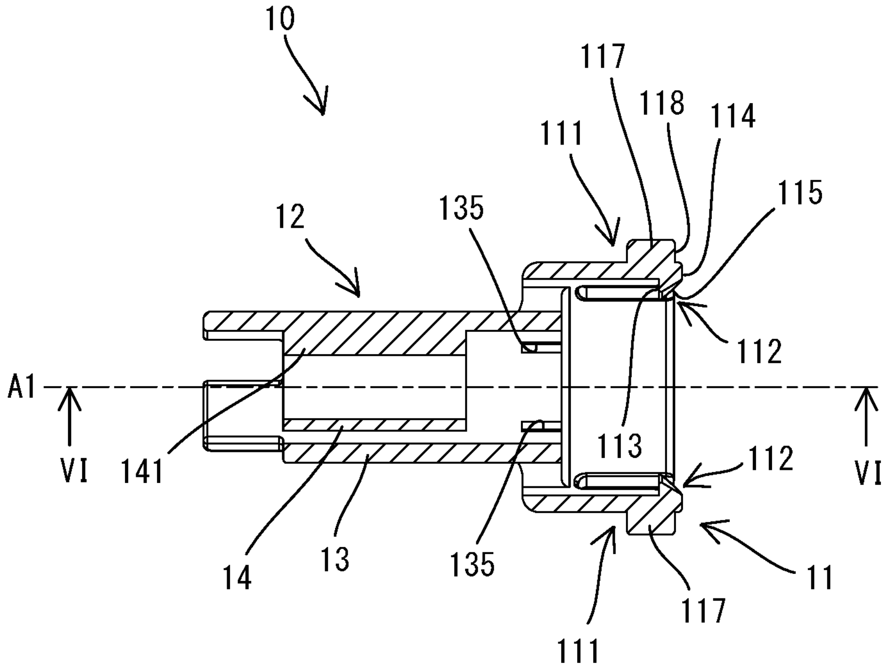
FIG. 5 is a sectional view of a base member.
Figure 6:
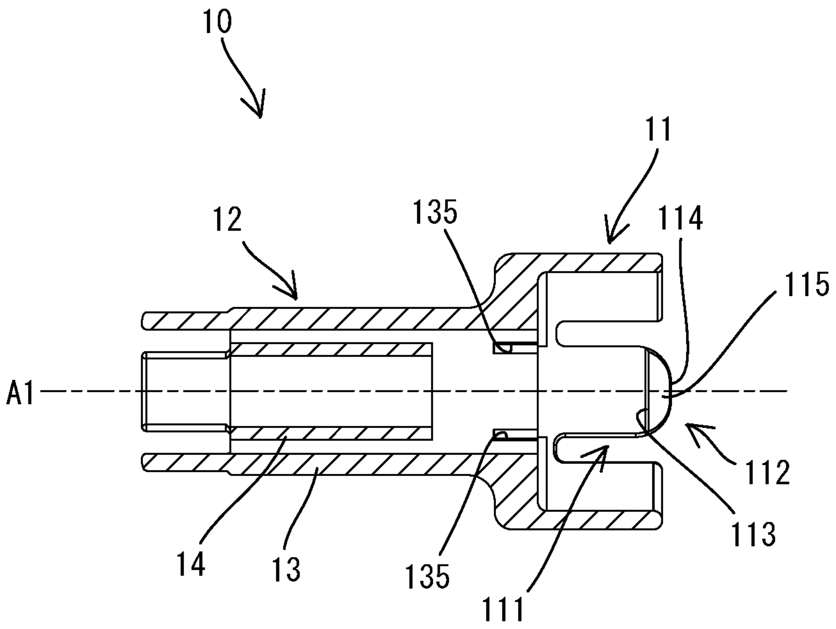
FIG. 6 is a sectional view taken along line VI-VI in FIG. 5.
Figure 7:
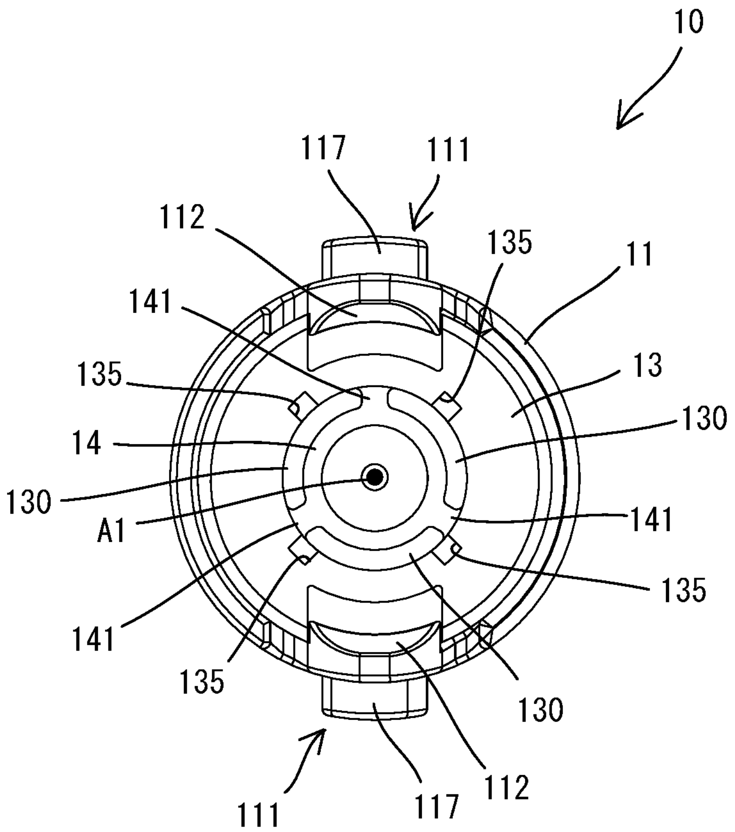
FIG. 7 is a back view of the base member.

As shown in FIGS. 5 to 7, the mounting part 11 has a generally hollow cylindrical shape. The mounting part 11 has a pair of (two) locking pieces 111 configured to engage with the lock mechanism 9 (see FIG. 1). The locking pieces 111 are arranged in symmetry across the axis A1 of the base member 11 and extend in the axial direction. Each of the locking pieces 111 is defined between two slits each extending forward from a rear end of the mounting part 11. Thus, a rear end of the locking piece 111 is a free end, so that the locking piece 111 can elastically deform in a radial direction of the nozzle 1, with its front end serving as a pivot point.

A rear end portion of the locking piece 111 has a claw (locking projection) 112. The claw 112 protrudes radially inward from the rear end of the locking piece 111. The claw 112 has a front end surface 113, a rear end surface 114 and an inclined surface 115. The front and rear end surfaces 113 and 114 extend generally perpendicular to the axis A1 of the nozzle 1. The inclined surface 115 is a surface connecting a radially inner end of the front end surface 113 and a radially inner end of the rear end surface 114 and inclined radially outward toward the rear.

The rear end portion of the locking piece 111 further has an actuation projection 117. The actuation projection 117 protrudes radially outward from an outer surface of the rear end portion. A center of the actuation projection 117 in a circumferential direction is positioned to coincide with a center of the claw 112 in a circumferential direction. The actuation projection 117 is arranged slightly forward of the claw 112, and a rear end of the actuation projection 117 is located slightly forward of the rear end of the rear end portion (the rear end surface 114 of the claw 112). The actuation projection 117 has a rear end surface 118 that is U-shaped with its central portion protruding rearward when viewed from radially outside. Thus, the rear end surface 118 of the actuation projection 117 is a curved surface.

The detailed structure of the nozzle part 82 (the lock mechanism 9) of the air duster 8 and attachment/detachment of the mounting part 11 to/from the nozzle part 82 will be described below.

As shown in FIGS. 5 to 7, the holding part 12 is a double-walled tube (hollow cylinder). Specifically, the holding part 12 includes an outer tube (outer cylinder) 13 and an inner tube (inner cylinder) 14 that are coaxially arranged with each other.

The outer tube 13 is a hollow cylindrical portion that extends forward from the mounting part 11. The outer tube 13 has a stepped hollow cylindrical shape having a rear end portion having an outer diameter larger than the other portion of the outer tube 13. The outer tube 13 has a uniform inner diameter slightly larger than the diameter of the discharge opening 820 of the air duster 8. Four recesses 135 are formed at equal intervals in the circumferential direction in an inner peripheral surface of the rear end portion of the outer tube 13. Each of the recesses 135 has an open rear end. Further, three rectangular openings 137 are formed at equal intervals in the circumferential direction in a front end portion of the outer tube 13. The openings 137 are formed through the outer tube 13 (i.e. a tubular wall, cylindrical wall) to provide communication between the inside and outside of the outer tube 13, and extend to a front end of the outer tube 13.

The inner tube 14 is a hollow cylindrical portion having substantially the same inner diameter as the outer diameter of the flexible tube 16. The inner tube 14 is within (radially inward of) the outer tube 13 such that there is a space between the inner tube 14 and the outer tube 13. More specifically, the inner tube 14 is connected to the outer tube 13 and supported by three ribs 141. The ribs 141 are spaced apart from each other in the circumferential direction around the axis A3. Thus, the three ribs 141 partition the space between the outer tube 13 and the inner tube 14 of the holding part 12 in the circumferential direction, into three spaces each extending in the front-rear direction. A rear end of the inner tube 14 is located forward of a rear end of the outer tube 13 (more specifically, forward of the recesses 135) in the front-rear direction. A front end of the inner tube 14 is located rearward of a front end of the outer tube 13. A rear end of each of the openings 137 of the outer tube 13 is located in (at) the same position in the front-rear direction as the front end of the inner tube 14.

Figure 4:
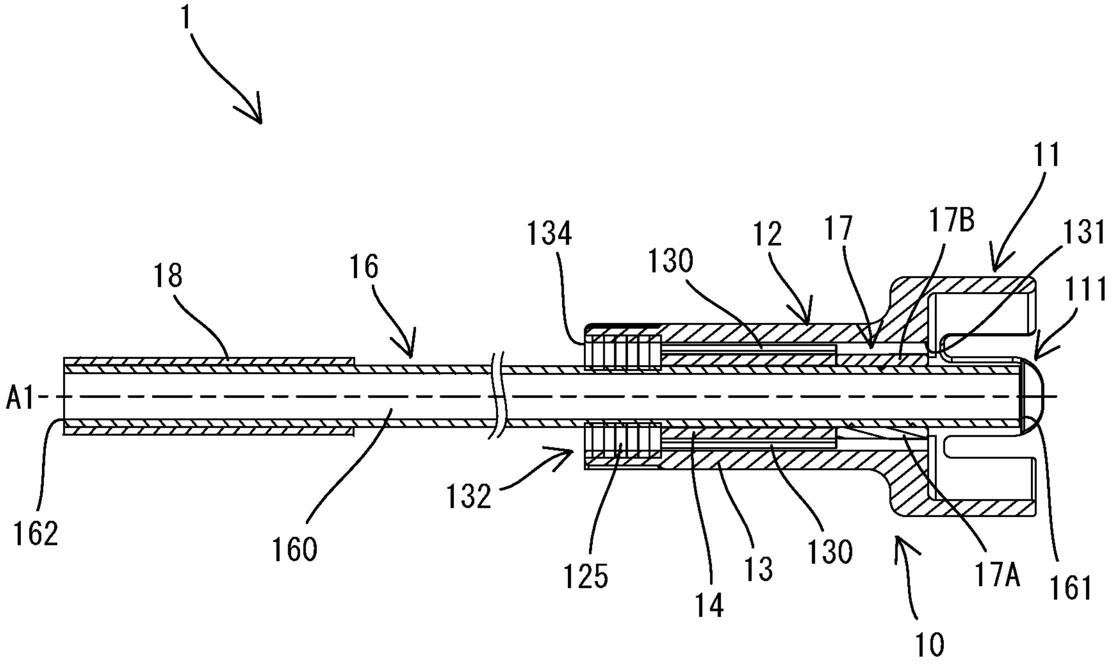
FIG. 4 is a sectional view taken along line IV-IV in FIG. 3.

The flexible tube 16 is now described. As shown in FIGS. 2 and 4, the flexible tube 16 is a tubular member (a tube or a pipe) that is flexible and made of synthetic resin (polymer). In this embodiment, the flexible tube 16 is formed of polyvinyl chloride (PVC) and has superior flexibility. The flexible tube 16 is a tubular member having a circular section, and has uniform outer and inner diameters when no external force is applied thereto. In this embodiment, the flexible tube 16 has an inner diameter of 6 mm and has a length of 70 cm.

One end portion of the flexible tube 16 is connected to the holding part 12. One end of the flexible tube 16 that is couped (connected) to the holding part 12 is hereinafter referred to as a base end, and the other end as a leading end. In this embodiment, when the nozzle 1 is attached to the air duster 8, air blown out by the centrifugal fan 885 of the air duster 8 flows into the nozzle 1 through an opening of the flexible tube 16 at the base end, flows through a passage 160 extending through the flexible tube 16, and is discharged from an opening of the flexible tube 16 at the leading end. The opening of the flexible tube 16 at the base end (a rear end inlet opening of the passage 160) is hereinafter referred to as an inlet opening 161, and the opening at the leading end (a front end outlet opening of the passage 160) is hereinafter referred to as a discharge opening 162.

A cover 18 is mounted onto a portion of the flexible tube 16 including the leading end portion. The cover 18 is formed of synthetic resin (polymer) having substantially no flexibility (or having significantly lower flexibility (having significantly higher rigidity) than the flexible tube 16). The cover 18 is a hollow cylindrical member having an inner diameter that is substantially equal to the outer diameter of the flexible tube 16, and is fitted around the flexible tube 16. An inner peripheral surface of the cover 18 is subjected to non-slip processing to suppress slippage of the flexible tube 16. The user can however pull and remove the cover 18 from the flexible tube 16 or moves the cover 18 to a different position relative to the flexible tube 16, as necessary.

A structure of connecting the flexible tube 16 and the holding part 12 is now described.

As shown in FIGS. 4 and 8 to 11, the flexible tube 16 is inserted through the inner tube 14. A base end portion of the flexible tube 16 protrudes rearward of the rear end of the outer tube 13. An engagement member 17 is fitted around the base end portion of the flexible tube 16. The engagement member 17 as a whole is a hollow cylindrical member having an inner diameter slightly smaller than the outer diameter of the flexible tube 16. In this embodiment, the engagement member 17 includes a first member 17A and a second member 17B. The first and second members 17A and 17B are each semi-cylindrical. The first and second members 17A and 17B are put together such that they abut on (contact) each other along a plane that contains an axis of the engagement member 17. The first and second members 17A and 17B have mostly the same structure. In the following description, the structure common to the first and second members 17A and 17B are given the same numerals.

Two ridges 171A are respectively formed on both axial end portions of an inner peripheral surface of the first member 17A. Each of the ridges 171A extends in the circumferential direction and has a generally triangular section. One ridge 171B is formed on a central portion of an inner peripheral surface of the second member 17B in the front-rear direction. The ridge 171B extends in the circumferential direction and has a generally triangular section. When the flexible tube 16 is placed between the first and second members 17A and 17B and the first and second members 17A and 17B are put together to abut on each other, the first and second members 17A and 17B press the flexible tube 16 radially inward and the ridges 171A and 171B bite into an outer peripheral surface of the flexible tube 16. Thus, the first and second members 17A and 17B hold the flexible tube 16 while restricting movement of the flexible tube 16 in the axial direction of the engagement member 17.

The ridge 171B of the second member 17B is offset from the ridges 171A of the first member 17A in the axial direction of the engagement member 17 in order to reduce the possibility that the flexible tube 16 is torn off due to a load being applied to the same position in the axial direction when the flexible tube 16 is pulled in the axial direction. The first and second members 17A and 17B may, however, have the same structure.

Figure 8:
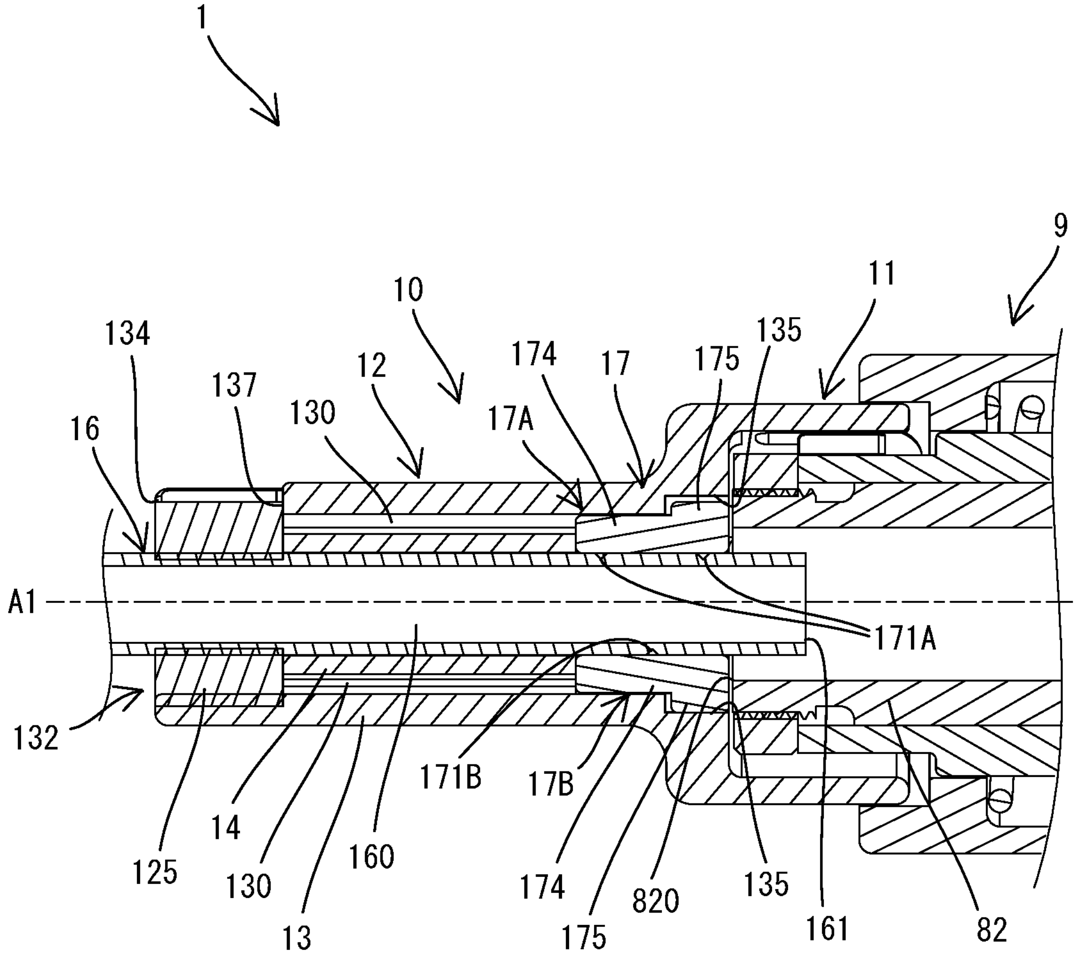
FIG. 8 is a partial, enlarged view of FIG. 4.
Figure 9:
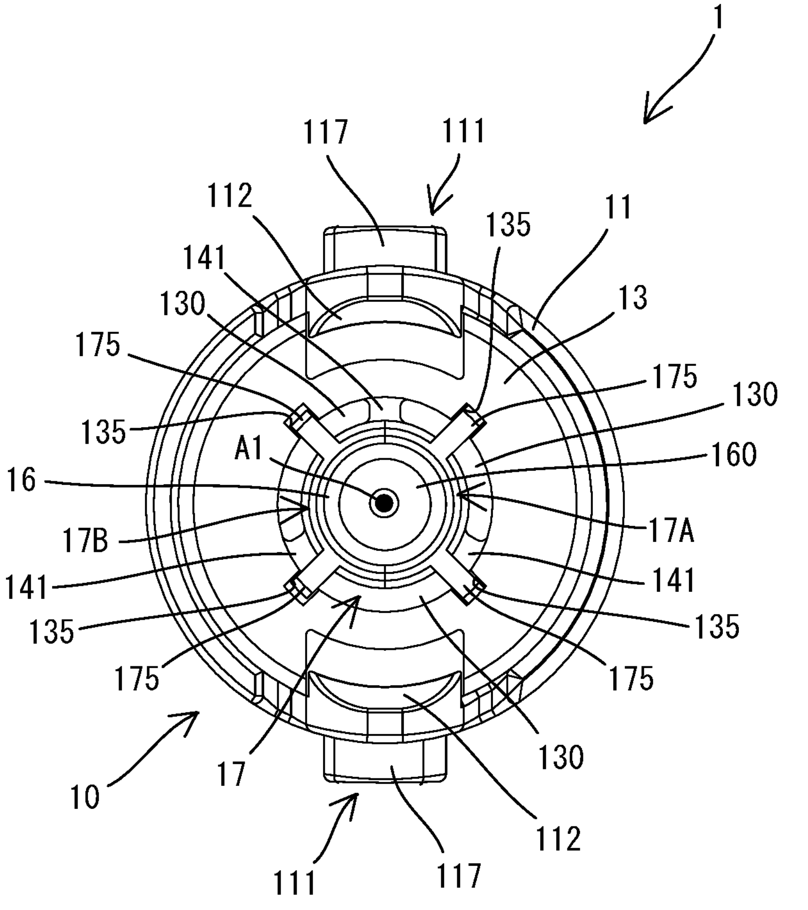
FIG. 9 is a back view of the nozzle.
Figure 10:
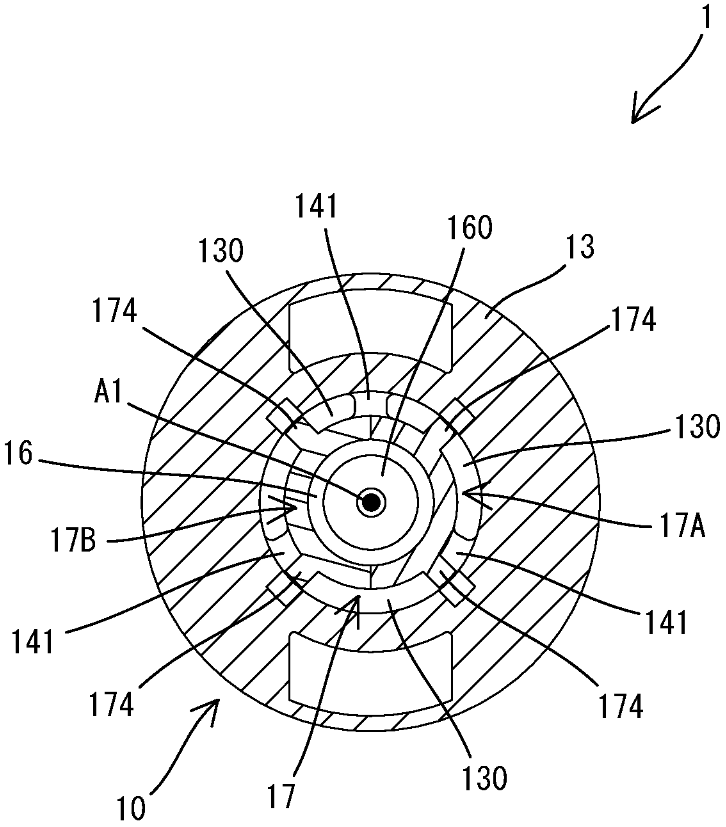
FIG. 10 is a sectional view taken along line X-X in FIG. 3.
Figure 11:
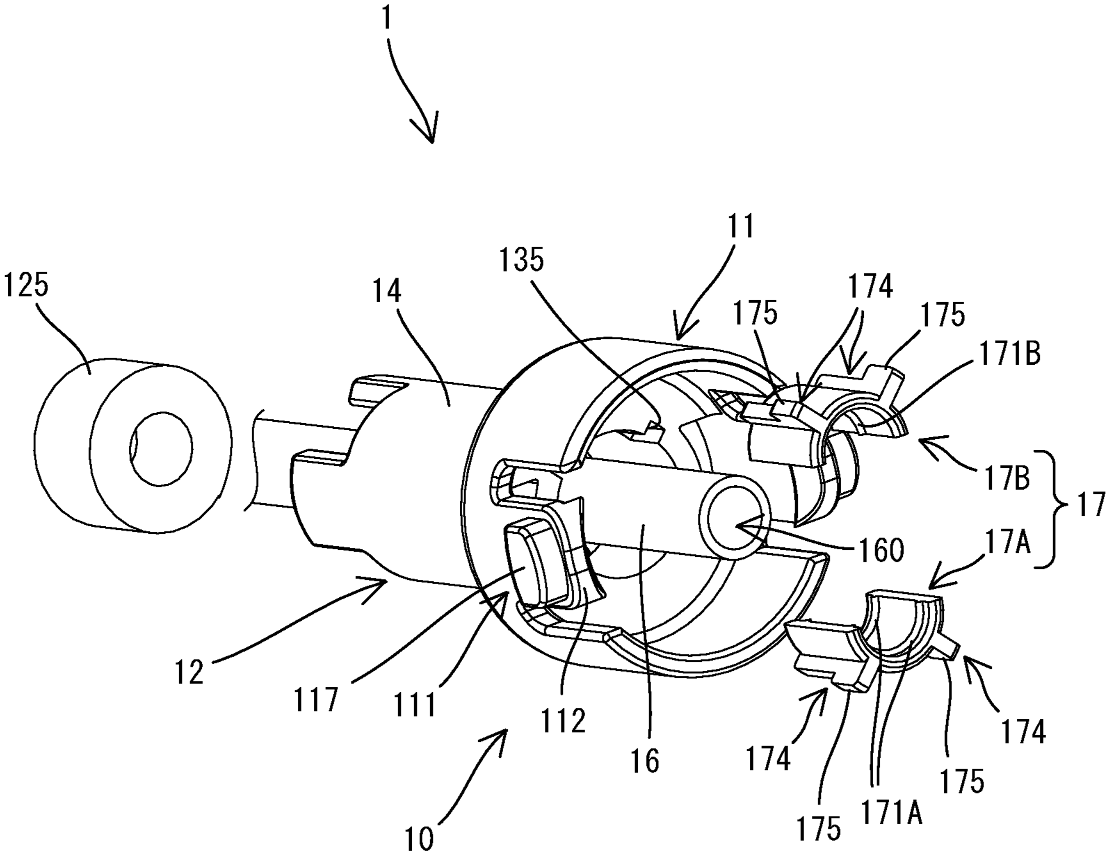
FIG. 11 is an exploded perspective view of the nozzle.

Further, each of the first and second members 17A and 17B has two projections 174 protruding radially outward from an outer peripheral surface thereof. When the first and second members 17A and 17B are put together, the four projections 174 are arranged at equal intervals in the circumferential direction. A rear end portion 175 of each of the projections 174 protrudes radially outward of the other portion of the projection 174, and is configured to be fitted in the recess 135 of the outer tube 13 as shown in FIGS. 8 and 9. The other portion of the projection 174 is configured to be fitted into the outer tube 13 as shown in FIGS. 8 and 10. The length of the projection 174 in the front-rear direction is substantially equal to the distance from the rear end of the inner tube 14 to the rear end of the outer tube 13. The first and second members 17A and 17B are positioned in the circumferential direction, with the base end portion of the flexible tube 16 held therebetween, such that the rear end portions 175 of the projections 174 are respectively aligned with the recesses 135, and then fitted into the rear end portion of the outer tube 13. In the front-rear direction, the first and second members 17A and 17B are each disposed in positions where the front ends of the projections 174 abut on (contact) the rear end of the inner tube 14. Thus, the inner tube 14 prevents forward movement of the engagement member 17.

With the above-described connecting structure, the flexible tube 16 is coupled (connected) to the holding part 12 via the engagement member 17 so as not to come off forward from the holding part 12. Thus, when the nozzle 1 is used with the air duster 8, the flexible tube 16 can be prevented from coming off from the holding part 12 (base member 10) due to discharge of the air.

As shown in FIG. 8, when the nozzle 1 is attached to the air duster 8, a front end of the nozzle part 82 of the air duster 8 abuts on (contacts) a rear end of the engagement member 17 and prevents rearward movement of the engagement member 17. On the other hand, when the nozzle 1 is not attached to the air duster 8 as shown in FIG. 4, the user can pull and remove the flexible tube 16, from which the cover 18 has been removed, rearward out of the holding part 12 together with the engagement member 17. Therefore, the user can use a flexible tube having a different length and/or a different inner diameter from the flexible tube 16 as necessary by attaching it to the holding part 12 via the engagement member 17.

As described above, the nozzle 1 according to this embodiment includes the flexible tube 16 having the discharge opening 162 and defining the passage 160 that leads to the discharge opening 162. The user can relatively freely change the position and orientation of the discharge opening 162 relative to the air duster 8, by bending the flexible tube 16. Particularly, since the flexible tube 16 has the length of 70 cm, the user can change the position and orientation of the discharge opening 162, that is, the position to which the air is blown and the air blowing direction within a very wide range, without need of moving the air duster 8. For example, the user can insert the flexible tube 16 even into a space that is too narrow to insert the air duster 8 in order to blow the air to a desired position in the space. Thus, the nozzle 1 can improve convenience of the air duster 8.

Further, the inflexible cover 18 can be fitted around the flexible tube 16. The user can therefore position the cover 18 at a desired position on the flexible tube 16 as necessary for use. The user can manipulate the flexible tube 16, while a portion (e.g. the leading end portion) of the flexible tube 16 covered by the cover 18 is kept unbendable. Thus, the cover 18 can enhance operability (maneuverability) of the flexible tube 16.

Further, the nozzle 1 of this embodiment has a structure for preventing surge. Specifically, in addition to the discharge opening 162, a vent hole (vent opening) 132 is formed in the nozzle 1 in order to increase a flow rate of the air to be discharged from the nozzle 1.

Surge is a phenomenon that a pressure and a flow rate of air in a piping pulsate (oscillate) periodically when a blower, a compressor or the like is connected to the piping, and is operated to discharge air at a lower flow rate than a regular rate. The characteristic of a blower is generally expressed by a characteristic curve (also referred to as a performance curve or a pressure curve) plotted on a graph in which the horizontal axis (x-axis) and the vertical axis (y-axis) respectively represent a flow rate and a static pressure of air discharged from the blower. It is known that surge occurs when the blower operates in a region (area) in which the characteristic curve extends upward and rightward (in a region in which the static pressure decreases as the flow rate decreases). This region is hereinafter referred to as a surge region (surge area). In the above-described graph, the surge region is a region on the left side of a boundary that is defined according to specifications of the blower. This boundary is also referred to as a surge line.

In this embodiment, the discharge opening 820 of the air duster 8 has a diameter of 13.0 mm, while the inner diameter of the flexible tube 16, i.e., the discharge opening 162, has a diameter of 6.0 mm. The surge region is defined according to specifications of the air duster 8 (e.g. specifications of the body housing 81, the motor 881 and the centrifugal fan 885). Further, it is known that, when the air duster 8 is connected to a piping that has a discharge opening having a diameter of 6.0 mm and operated, a flow rate of air discharged from (through) the discharge opening falls within the surge region in the above-described graph. Therefore, if the nozzle 1 is connected to the air duster 8 and the air is discharged only from the discharge opening 162, surge may occur.

Therefore, in this embodiment, as shown in FIGS. 4 and 8, in addition to the discharge opening 162, the nozzle 1 has the vent hole 132 formed radially outward of the flexible tube 16. The vent hole 132 is configured to prevent surge by additionally letting out air therethrough and thereby increasing the total amount of air discharged from the nozzle 1. The flow rate to be increased (i.e., the flow rate of the air to be discharged from the vent hole 132) to prevent surge can be specified based on the characteristic curve of the air duster body 8 and the surge region (surge line). The required increase of the flow rate can be realized by properly setting (increasing) the area of the vent hole 132. Thus, provision of the vent hole 132 increases the total flow rate of the air discharged from the nozzle 1, such that the total flow rate is out of the surge region, thereby preventing surge.

More specifically, as shown in FIGS. 4, 8 and 10, a vent passage 130 is formed radially outward of the flexible tube 16 and connected to the vent hole 132. The vent passage 130 extends in the front-rear direction in the outer tube 13. The vent passage 130 is formed by a first space that is defined between the outer tube 13 and the engagement member 17 behind the rear end of the inner tube 14, a second space that is defined between the outer tube 13 and the inner tube 14, and a third, annular space that is defined between the front end portion of the outer tube 13 and the flexible tube 16 in front of the front end of the inner tube 14. In this embodiment, when the nozzle 1 is attached to the air duster 8, the air blown out by the centrifugal fan 885 of the air duster 8 flows into the nozzle 1 from a rear end opening of the vent passage 130 (hereinafter referred to as an inlet opening 131), flows through the vent passage 130, and is discharged from the vent hole 132. In this embodiment, the vent hole 132 is formed (defined) by a front end opening 134 and the above-described three openings 137 of the outer tube 13.

Further, in this embodiment, a ventilation resistance member 125 (airflow resistance member) is disposed in a front end portion of the vent passage 130 (in the above-described third (annular) space between the front end portion of the outer tube 13 and the flexible tube 16). The ventilation resistance member 125 is configured to reduce the flow velocity of air by serving as resistance while allowing the air to pass through the ventilation resistance member 125. In this embodiment, an open-celled synthetic resin (polymer) (such as a polyurethane sponge) is used as the ventilation resistance member 125. The ventilation resistance member 125 has a hollow cylindrical shape and is fitted into the front end portion of the outer tube 13 with the flexible tube 16 inserted therethrough. The ventilation resistance member 125 is held in a slightly compressed state between the flexible tube 16 and the outer tube 13. The axial length of the ventilation resistance member 125 is substantially equal to the length of the openings 137 formed in the cylindrical wall of the outer tube 13 in the front-rear direction.

With such arrangement, when the air duster 8 is operated, the air flows into the vent passage 130 from the rear end inlet opening 131 of the outer tube 13 and passes through the vent passage 130 and the ventilation resistance member 125 and then flows out from the vent hole 132 to the front and radially outward of the outer tube 13. The total flow rate of the air discharged from the discharge opening 162 and the air flowing out through the vent hole 132 via the ventilation resistance member 125 is set to be outside the surge region, so that surge is not caused.

In this embodiment, the flow velocity of the air flowing out through the vent hole 132 is reduced while passing through the ventilation resistance member 125. Therefore, the pressure (wind pressure) of the air flowing out through the vent hole 132 is reduced, compared with a structure not having the ventilation resistance member 125. Thus, the ventilation resistance member 125 can prevent high-pressure air from being blown from the vent hole 132 to an unintended position. Further, the flow rate of the air flowing out through the vent hole 132 is reduced, compared with a structure not having the ventilation resistance member 125. Therefore, in this embodiment, the area of the vent hole 132 is set to be larger than that of the structure not having the ventilation resistance member 125. Specifically, in the structure not having the ventilation resistance member 125, even if the vent hole 132 is formed only by the front end opening 134, the frow rate out of the surge region can be secured. On the other hand, in this embodiment, considering the reduced flow rate due to the ventilation resistance member 125, the area of the vent hole 132 is increased by provision of the three openings 137 in addition to the front end opening 134 of the outer tube 13, so that the required increase of the flow rate can be achieved.

The structures of the nozzle part 82 and the lock mechanism 9 of the air duster 8 are now described.

As shown in FIG. 1, the body housing 81 of the air duster 8 includes a hollow cylindrical part 811 and a front cover 813 connected to a front end portion of the cylindrical part 811. In this embodiment, the front cover 813 is separately formed from the cylindrical part 811. The front cover 813 is threadedly engaged with the front end portion of the cylindrical part 811 and covers a front end opening of the cylindrical part 811. The front cover 813 has a tapered funnel shape (hollow conical cylindrical shape) as a whole. The nozzle part 82 is a hollow cylindrical front end portion of the front cover 813. The lock mechanism 9 is mounted on (around) the nozzle part 82. The nozzle 1 can be attached (coupled, connected, mounted) to and detached (decoupled, removed) from the nozzle part 82 via the lock mechanism 9.

Figure 12:
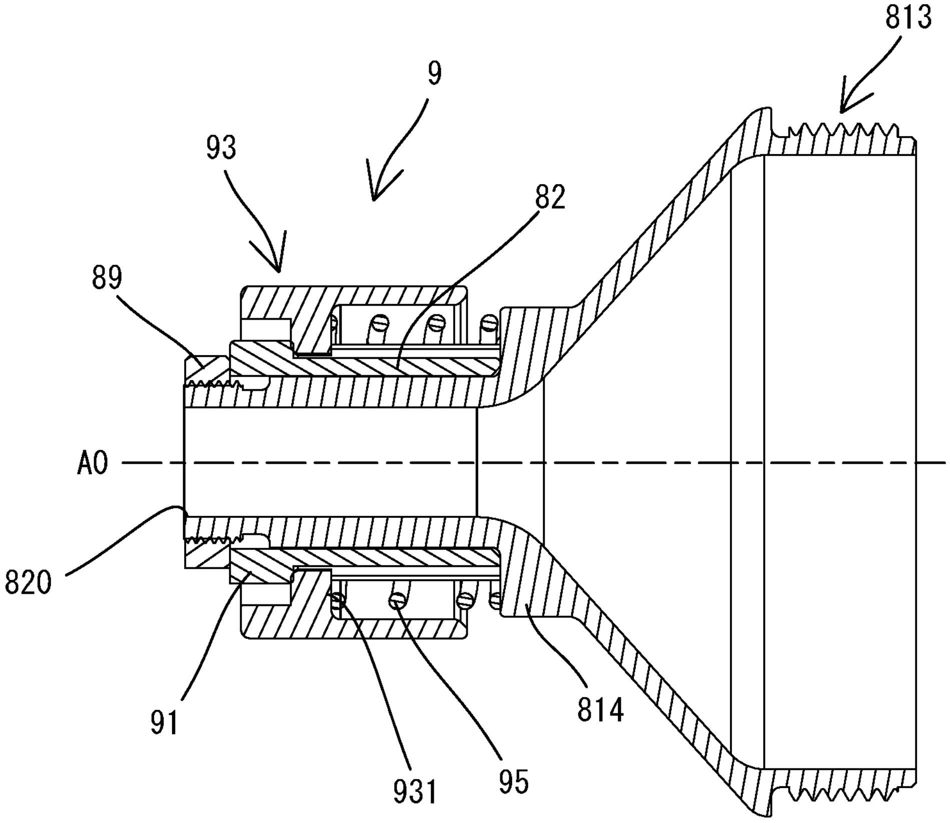
FIG. 12 is a sectional view of a front cover and a lock mechanism.

The lock mechanism 9 is now described. The lock mechanism 9 is configured to lock the nozzle 1 to the air duster 8 in (at) a specified attachment position. As shown in FIG. 12, the lock mechanism 9 includes a lock sleeve 91 that is fixed to the air duster 8, a slide sleeve 93 that is movable relative to the lock sleeve 91 only in the front-rear direction, and a biasing spring 95 that biases the slide sleeve 93 forward relative to the lock sleeve 91.

As shown in FIGS. 12 to 16, the lock sleeve 91 has a hollow cylindrical shape. The lock sleeve 91 is coaxially fitted around the nozzle part 82 of the front cover 813 and fixed to the front cover 813 with a nut 89.

The lock sleeve 91 is configured to engage with the nozzle 1. More specifically, the outer diameter of the lock sleeve 91 is substantially equal to the inner diameter (the inner diameter of a portion excluding the claws 112) of the mounting part 11 (see FIG. 5) of the nozzle 1. A pair of (two) locking grooves 913 are formed in the outer peripheral surface of the lock sleeve 91. The locking grooves 913 are arranged in symmetry across the axis of the lock sleeve 91. Each of the locking grooves 913 is a recess that is recessed radially inward from the outer peripheral surface of the lock sleeve 91 and that extends in the circumferential direction around the axis. The locking groove 913 is configured to engage with the claw 112 of the locking piece 111 of the nozzle 1.

Guide parts 915 are respectively provided in front of the locking grooves 913. The guide part 915 is configured to smoothly guide the claw 112 of the locking piece 111 to the corresponding locking groove 913. The guide part 915 is a recess that is recessed radially inward from the outer peripheral surface of the lock sleeve 91 and that extends from the front end of the lock sleeve 91 to a vicinity of the front end of the locking groove 913. The guide part 915 has an inclined surface 916 gently inclined radially outward toward the rear.

A release groove 917 is connected to one end portion of the locking groove 913 in the circumferential direction. More specifically, the release groove 917 extends continuously from one end portion of the locking groove 913 that is on a clockwise side in the circumferential direction when the lock sleeve 91 is viewed from the front. The release groove 917 is a recess that has substantially the same depth as the locking groove 913 and that extends linearly forward to the front end of the lock sleeve 91. The release groove 917 thus has an open front end. The release groove 917 is provided to release the claw 112 of the locking piece 111 from the locking groove 913 (that is, to allow forward movement of the nozzle 1). The circumferential width of the release groove 917 is slightly larger than the width of the claw 112 of the locking piece 111.

Figure 13:
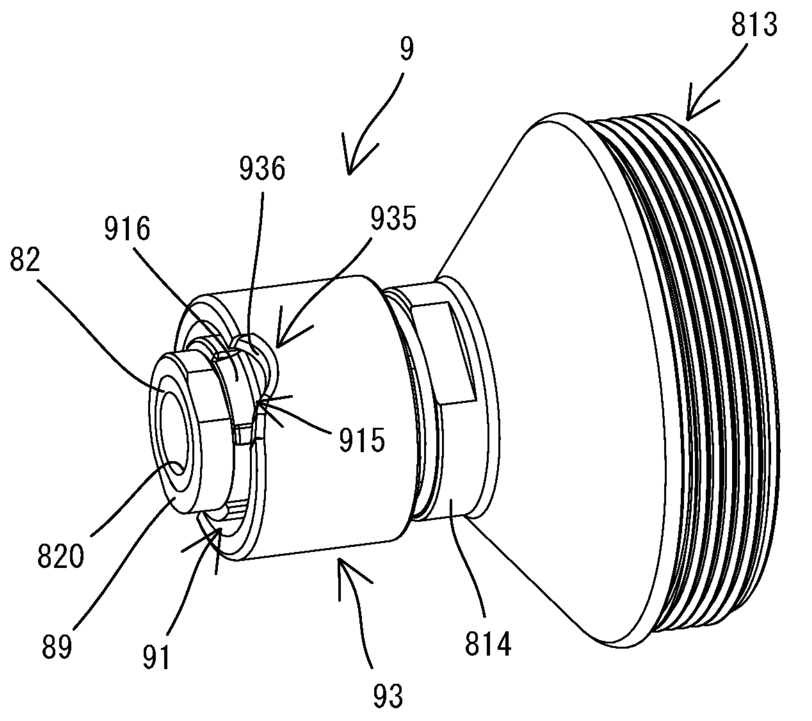
FIG. 13 is a perspective view of the front cover and the lock mechanism.
Figure 17:
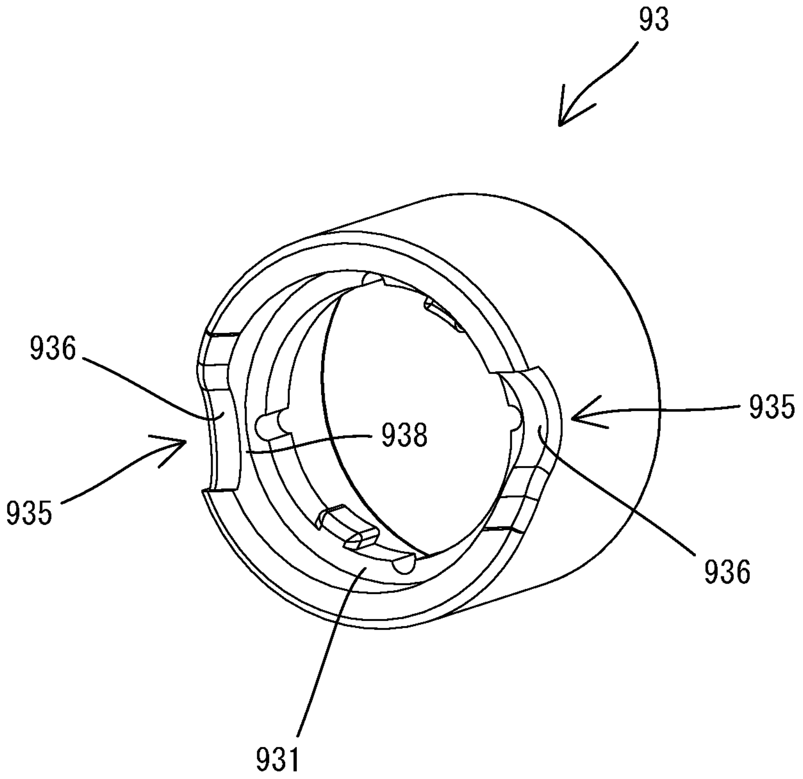
FIG. 17 is a perspective view of a slide sleeve.

As shown in FIGS. 12, 13 and 17, the slide sleeve 93 has a hollow cylindrical shape. The slide sleeve 93 is arranged radially outward of (around) the lock sleeve 91 and held (supported) to be movable relative to the lock sleeve 91 only in the axial direction (the front-rear direction).

The slide sleeve 93 has a pair of (two) receiving recesses 935 each configured to engage with the actuation projection 117 (see FIG. 2) formed on the mounting part 11 of the nozzle 1. The receiving recesses 935 are arranged in symmetry across an axis of the slide sleeve 93. Each of the receiving recesses 935 is recessed rearward from a front end of the slide sleeve 93 and has a U-shape generally conforming to the actuation projection 117 of the nozzle 1 when viewed from radially outside. A surface that defines the receiving recess 935 is an abutment surface (contact surface) 936, which is a curved surface configured to abut on (contact) the rear end surface 118 of the actuation projection 117.

As shown in FIG. 12, the biasing spring 95 is disposed between the lock sleeve 91 and the slide sleeve 93 in the radial direction. The biasing spring 95 of this embodiment is a compression coil spring. The biasing spring 95 is disposed in a compressed state between a spring receiving part 931 formed on the inside of the slide sleeve 93 and a shoulder part 814 formed on the front cover 813 behind the nozzle part 82. The biasing spring 95 always biases the slide sleeve 93 forward, so that the slide sleeve 93 is held in (at) a front position in an initial state where the nozzle 1 is not coupled to the lock mechanism 9. Further, the receiving recesses 935 of the slide sleeve 93 are positioned radially outward of the guide parts 915 of the lock sleeve 91, respectively.

Operation of the lock mechanism 9 is now described.

First, operation of the lock mechanism 9 in attachment of the nozzle 1 to the air duster 8 is described.

When attaching the nozzle 1 to the air duster 8, the user moves the nozzle 1 linearly rearward toward the air duster 8. This manual operation (manipulation) performed on the nozzle 1 by the user is hereinafter also referred to as attaching operation. More specifically, the user properly adjusts the circumferential position of the nozzle 1 relative to the lock mechanism 9 and pushes the nozzle 1 into the lock mechanism 9 along the rotational axis A0 from the front. As a mark for positioning the nozzle 1, the actuation projection 117 formed on the outer surface of the locking piece 111 of the nozzle 1 (see FIG. 5) and the receiving recess 935 of the slide sleeve 93 (see FIG. 17) can be used. Aligning the actuation projection 117 with the receiving recess 935 in the circumferential direction is equivalent to aligning the claw 112 with the guide part 915 and thus with the locking groove 913.

Figure 15:
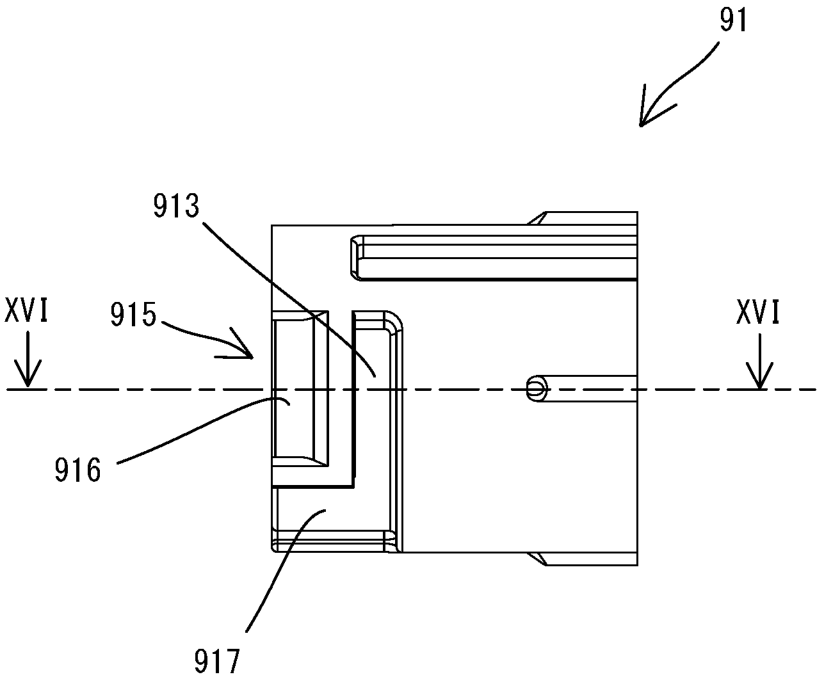
FIG. 15 is a side view of the lock sleeve
Figure 16:
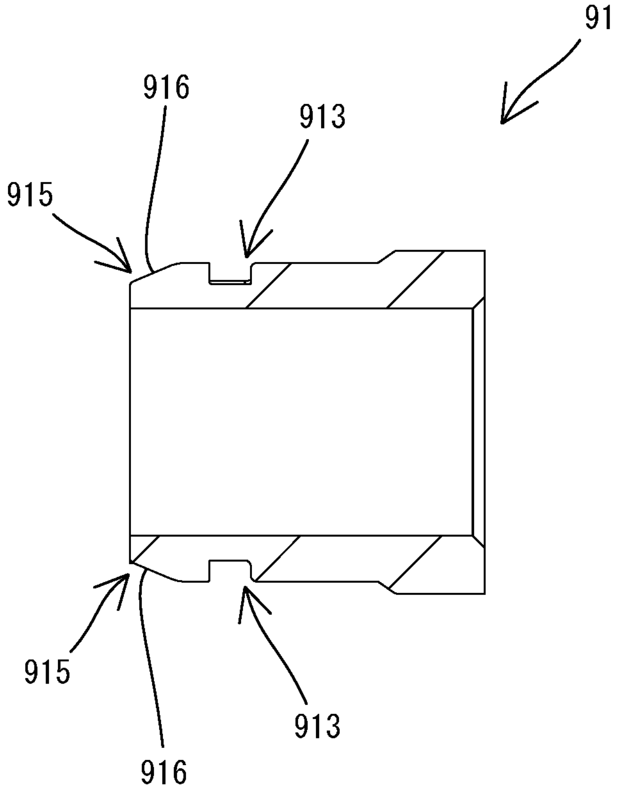
FIG. 16 is a sectional view taken along line XVI-XVI in FIG. 15.
Figure 18:
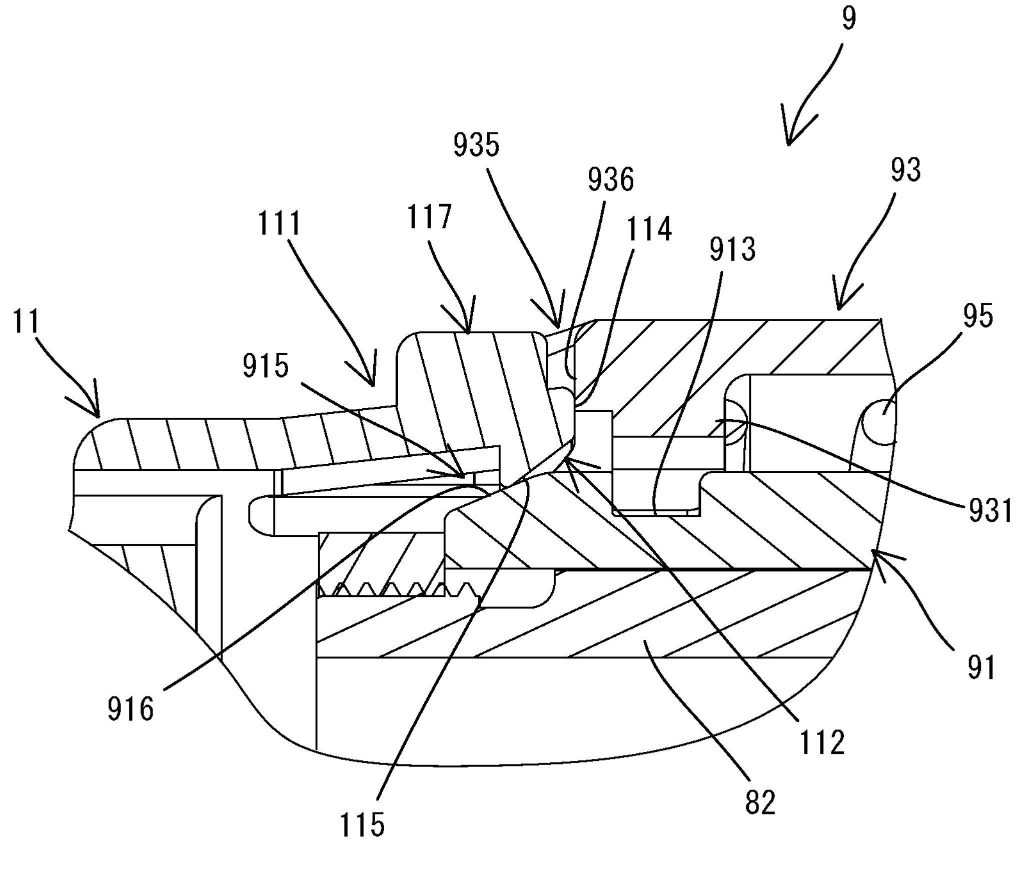
FIG. 18 is an explanatory drawing for illustrating operation of the lock mechanism in a process of attaching the nozzle to the air duster.

When the user pushes the nozzle 1 onto (into) the lock mechanism 9, the claws 112 of the locking pieces 111 abut on the guide parts 915 of the lock sleeve 91 (see FIG. 15). More specifically, the inclined surface 115 of the claw 112 abuts on the inclined surface 916 of the guide part 915, respectively. When the nozzle 1 is moved rearward in this state, the locking piece 111 elastically deforms such that its locking end moves radially outward. When the user further pushes (moves) the nozzle 1 rearward, as shown in FIG. 18, the rear end surfaces 114 of the claws 112 abut on (come into contact with) the abutment surfaces 936 of the receiving recesses 935 of the slide sleeve 93, respectively, and move the slide sleeve 93 rearward relative to the lock sleeve 91 against the biasing force of the biasing spring 95. The mounting part 11 of the nozzle 1 (excluding the locking pieces 111) enters a gap between the lock sleeve 91 and the slide sleeve 93.

Figure 19:
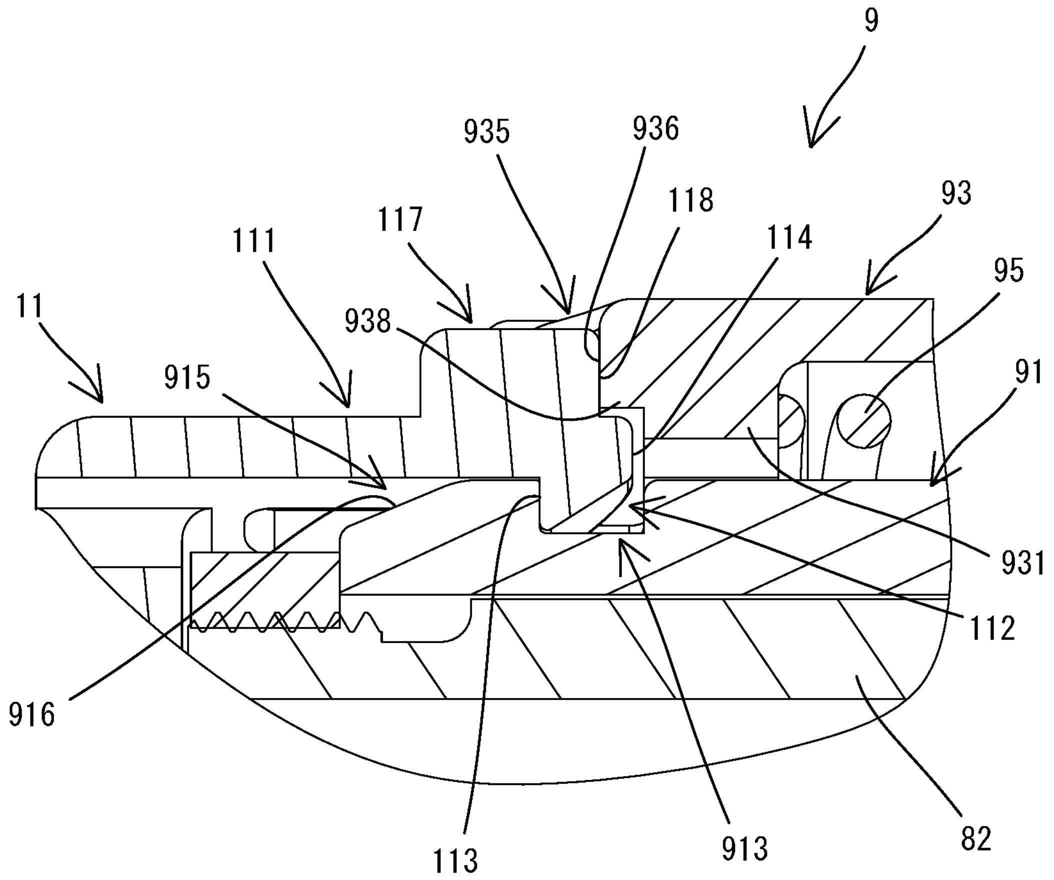
FIG. 19 is an explanatory drawing for illustrating the lock mechanism when the nozzle is placed in an attachment position.

When the claws 112 climb onto the outer peripheral surface of the lock sleeve 91 via the inclined surfaces 916 of the guide parts 915 and reach the locking grooves 913, respectively, as shown in FIG. 19, the claws 112 move radially inward by the restoring force of the locking pieces 111 and return to their initial positions to be engaged with the locking grooves 913, respectively. At this time, the rear end surfaces 114 of the claws 112 are separated (disengaged) from the corresponding abutment surfaces 936 of the receiving recesses 935 and thus release (stop) rearward pressing of the slide sleeve 93. Consequently, the slide sleeve 93 is moved forward by the biasing force of the biasing spring 95 and held in (at) a position (hereinafter referred to as a locking position) in (at) which the abutment surfaces 936 of the receiving recesses 935 respectively abut on the rear end surfaces 118 of the actuation projections 117 of the nozzle 1. Specifically, the slide sleeve 93 is held with the actuation projections 117 respectively fitted (engaged) in the receiving recess 935.

As shown in FIG. 19, when the slide sleeve 93 is placed in the locking position, a portion (a wall portion) of the slide sleeve 93 between the rear end (the deepest portion of each receiving recess 935 and the front end of the spring receiving part 931 is located radially outward of the rear end portion (the claw 112) of the locking piece 111. This wall portion functions as a restricting part 938, which restricts elastic deformation of the locking piece 111 in such a direction that the claw 112 is disengaged from the locking groove 913 and thereby keeps the claw 112 engaged with the locking groove 913. Further, as shown in FIG. 20, the receiving recesses 935 are engaged with the actuation projections 117 while the slide sleeve 93 is biased forward, so that rotational (pivotal) movement of the nozzle 1 around the rotational axis A0 is restricted.

In this manner, the lock mechanism 9 locks the nozzle 1 so as not to move forward, in a (at) position in (at) which the claws 112 are respectively engaged with the locking grooves 913. The position of the nozzle 1 at this time is hereinafter also referred to as the attachment position. The lock mechanism 9 further restricts rotation of the nozzle 1 placed in the attachment position.

Operation of the lock mechanism 9 in detachment of the nozzle 1 from the air duster 8 is now described.

Figure 20:
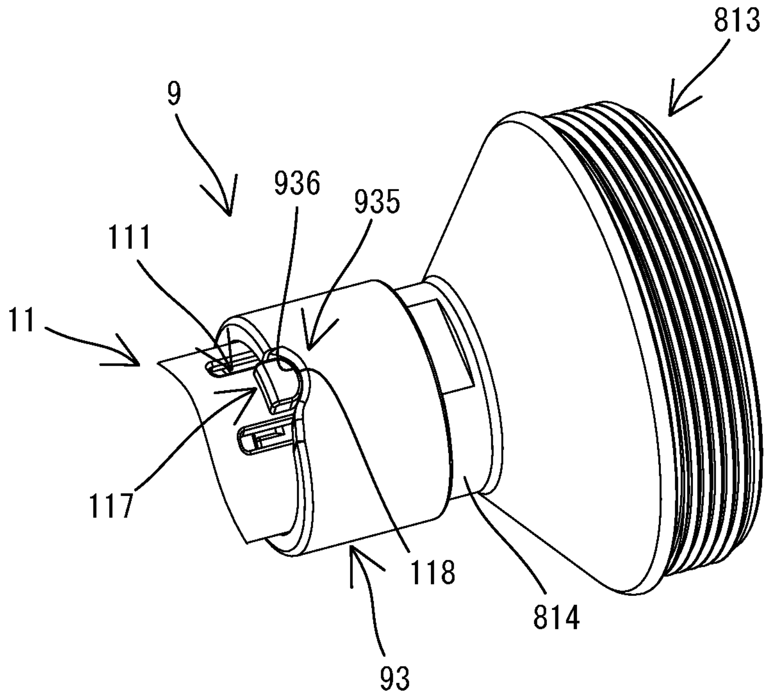
FIG. 20 is a perspective view of the lock mechanism when the nozzle is placed in the attachment position.

When detaching the nozzle 1 locked (held) in the attachment position as shown in FIG. 20 from the air duster 8, the user first turns (rotates, pivots) the nozzle 1 relative to the air duster 8 around the axis of the nozzle 1 so as to release locking of (unlock) the lock mechanism 9. This manual operation (manipulation) of turning the nozzle 1 performed by the user is hereinafter also referred to as an unlocking operation. More specifically, the user holds the nozzle 1 and turns the nozzle 1 around the rotational axis A0 in the clockwise direction as viewed from the front. As described above, the slide sleeve 93 is biased forward in a non-rotatable state, and the actuation projections 117 are respectively fitted in (engaged with) the receiving recess 935. When the user turns the nozzle 1 against the biasing force of the biasing spring 95, the circumferential force is converted into an axial force and acts upon the slide sleeve 93 to move the slide sleeve 93 rearward, by cooperation between an end portion of the rear end surface 118 (curved surface) of each actuation projection 117 on the turning direction side (the clockwise direction side in the circumferential direction as viewed from the front) and an end portion of the abutment surface 936 (curved surface) of each receiving recess 935 on the turning direction side.

Figure 14:
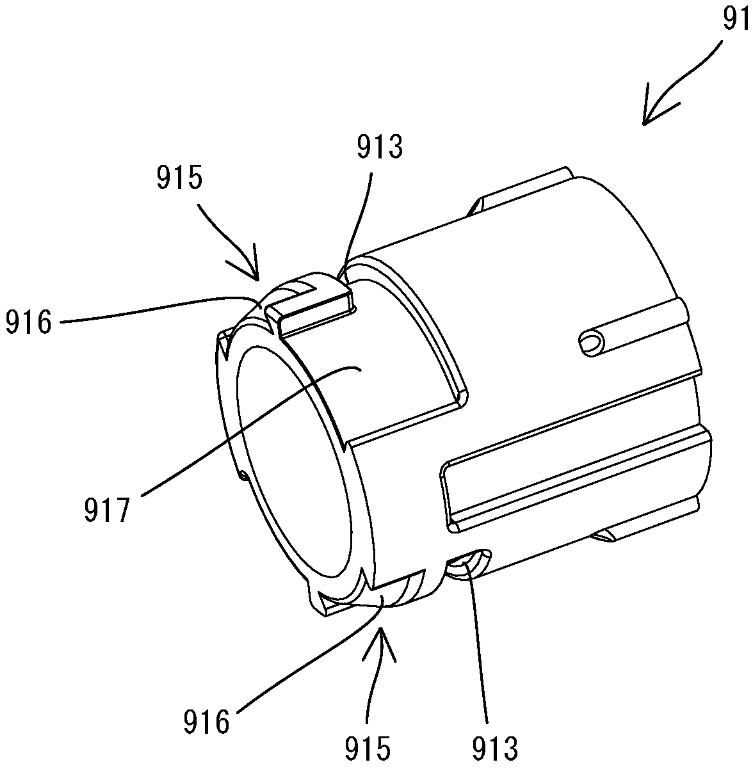
FIG. 14 is a perspective view of the lock sleeve.
Figure 21:
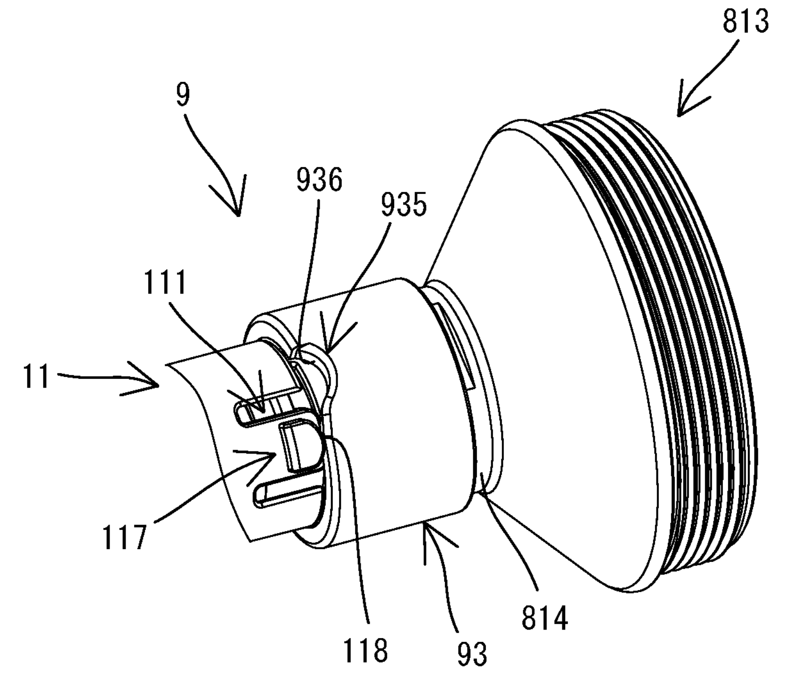
FIG. 21 is a perspective view of the lock mechanism in a process of detaching the nozzle from the air duster.

As shown in FIG. 21, after the actuation projections 117 are disengaged from the receiving recess 935, the nozzle 1 is turned with the rear end surface 118 of each actuation projection 117 in abutment (contact) with the front end surface of the slide sleeve 93 while each claw 112 moves in the circumferential direction within the locking groove 913 (see FIGS. 14 and 15). When the user continues to turn the nozzle 1, the claws 112 respectively enter the release grooves 917 (see FIGS. 14 and 15). When each of the claws 112 is completely placed within the release groove 917 (the position of the nozzle 1 at this time is also referred to as a detachment position), the claw 112 is disengaged from the locking groove 913 and allowed to move forward along the release groove 917. Thus, locking of the lock mechanism 9 is released (the lock mechanism 9 is unlocked).

After turning the nozzle 1 to the detachment position, the user moves the nozzle 1 linearly forward relative to the air duster 8 and separates (detaches, removes) the nozzle 1 from the air duster 8. This user's manual operation (manipulation) of linearly moving the nozzle 8 forward is hereinafter also referred to as a separating operation (or detaching operation, removing operation). More specifically, the user pulls the nozzle 1 forward out of the lock mechanism 9 along the rotational axis A0. As described above, the release groove 917 has substantially the same depth as the locking groove 913. The claw 112 is therefore allowed to move forward within the release groove 917 without elastic deformation of the locking piece 111 when the nozzle 1 is moved forward in response to the separating operation. Further, the slide sleeve 93 is biased by the biasing spring 95 and moved to the front position (see FIG. 12) as the nozzle 1 is moved forward and separated from the air duster. When the nozzle 1 is separated from the air duster 8 (the lock mechanism 9), detachment of the nozzle 1 is completed.

As described above, when the nozzle 1 is moved rearward relative to the air duster 8 and placed in the attachment position relative to the air duster 8, the lock mechanism 9 is actuated to lock the mounting part 11 of the nozzle 1 in the attachment position so as not to move forward. The lock mechanism 9 therefore locks the mounting part 11 in response to simple user's manipulation of moving the nozzle 1 in only one direction (rearward). Provision of the mounting part 11 can thus provide excellent operability (maneuverability) for the nozzle 1. Since the nozzle 1 is locked so as not to move forward, the nozzle 1 does not come off from the air duster 8 even when the user pulls the nozzle 1 forward or even when the air is blown out from the discharge opening 820 of the air duster 8 into the nozzle 1.

Second Embodiment

A nozzle 2 according to a second embodiment of the present disclosure is described with reference to FIGS. 22 to 26. The nozzle 2 is another example of the nozzles that can be attached to the air duster 8. The nozzle 2 of this embodiment partially has substantially the same structure as the nozzle 1 of the first embodiment. Therefore, components of the nozzle 2 that are substantially identical to those of the nozzle 1 are given the same numerals as in the first embodiment and are not described or briefly described, and a different structure is mainly described. The same applies to the following embodiments.

Figure 22:
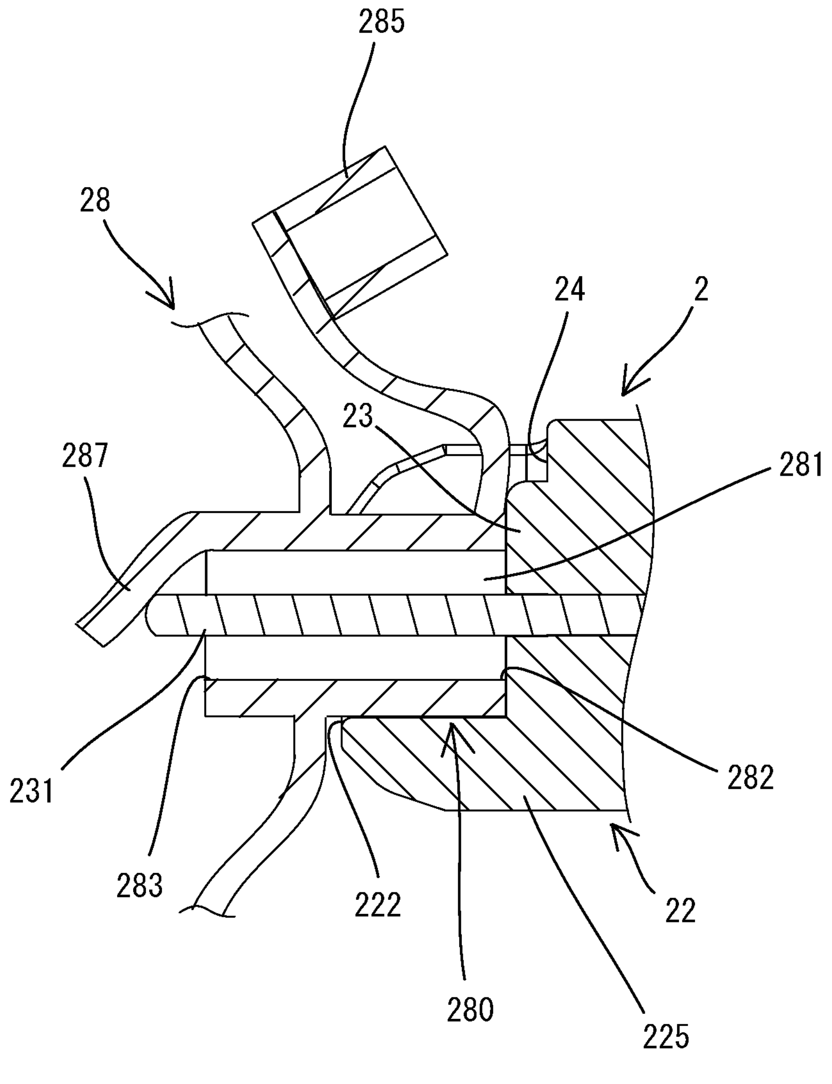
FIG. 22 shows an example of an air injection projection.
Figure 23:
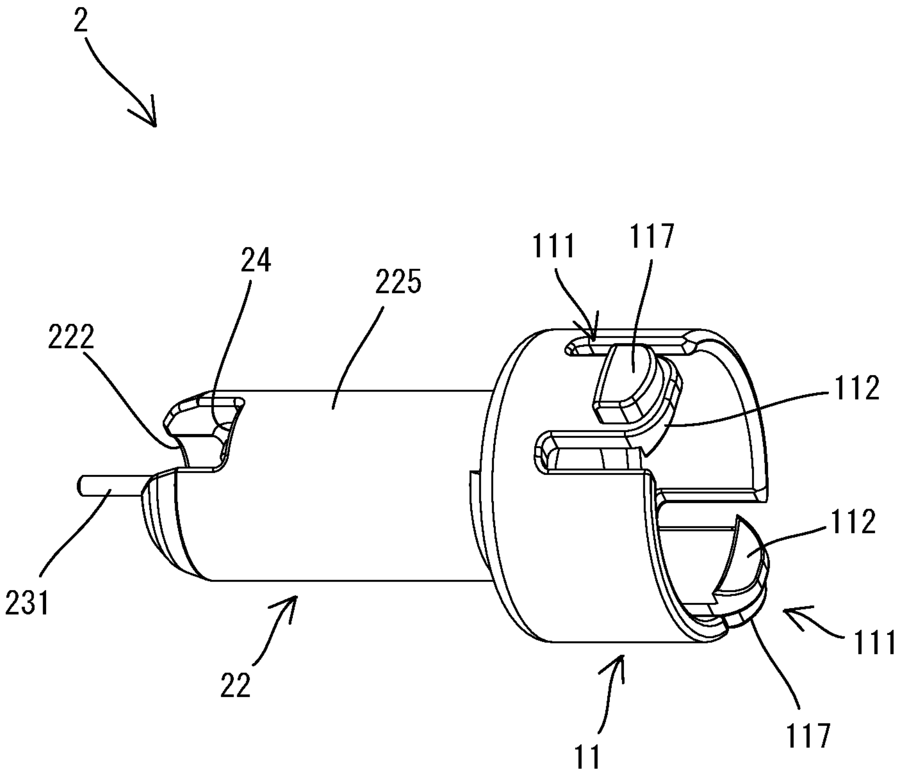
FIG. 23 is a perspective view of another nozzle.
Figure 24:
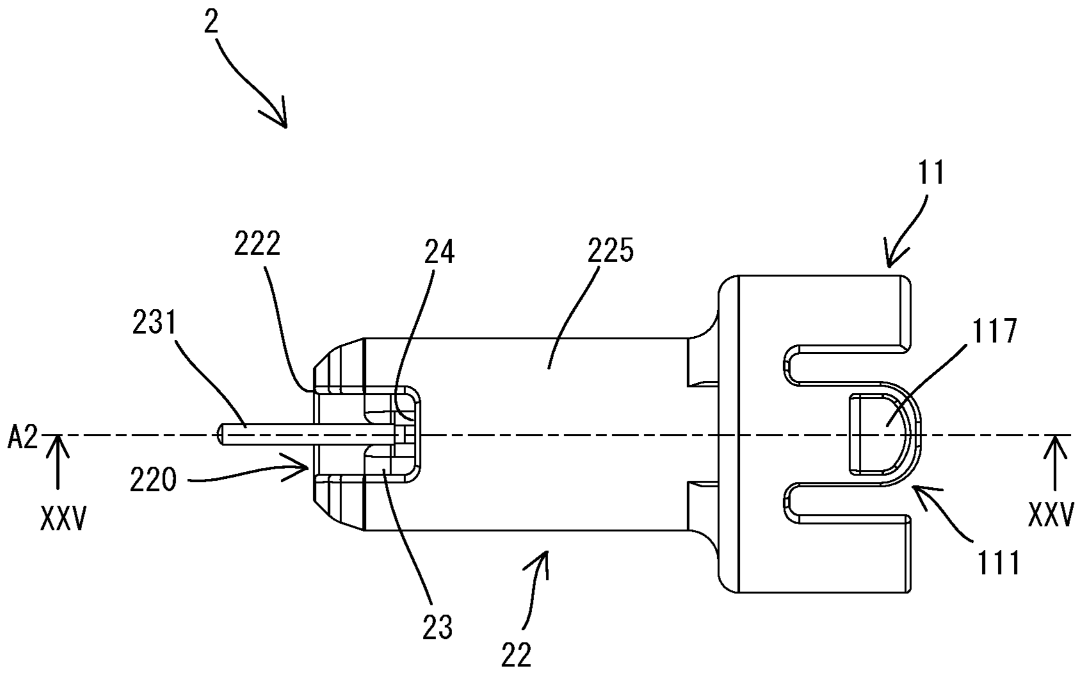
FIG. 24 is a side view of the nozzle.
Figure 25:
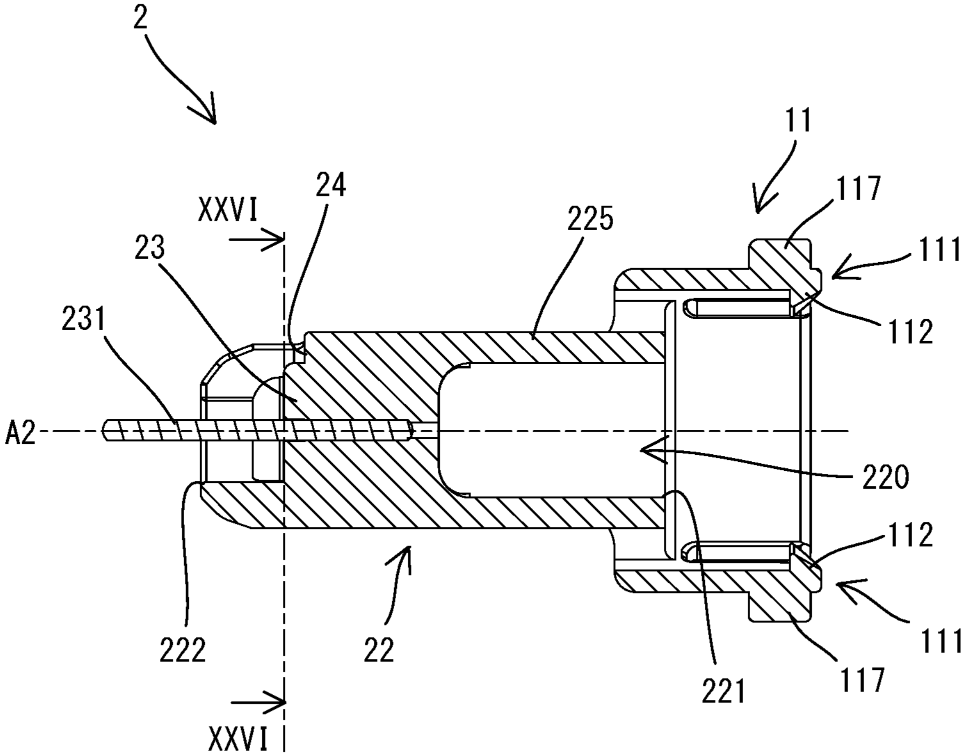
FIG. 25 is a sectional view taken along line XXV-XXV in FIG. 24.
Figure 26:
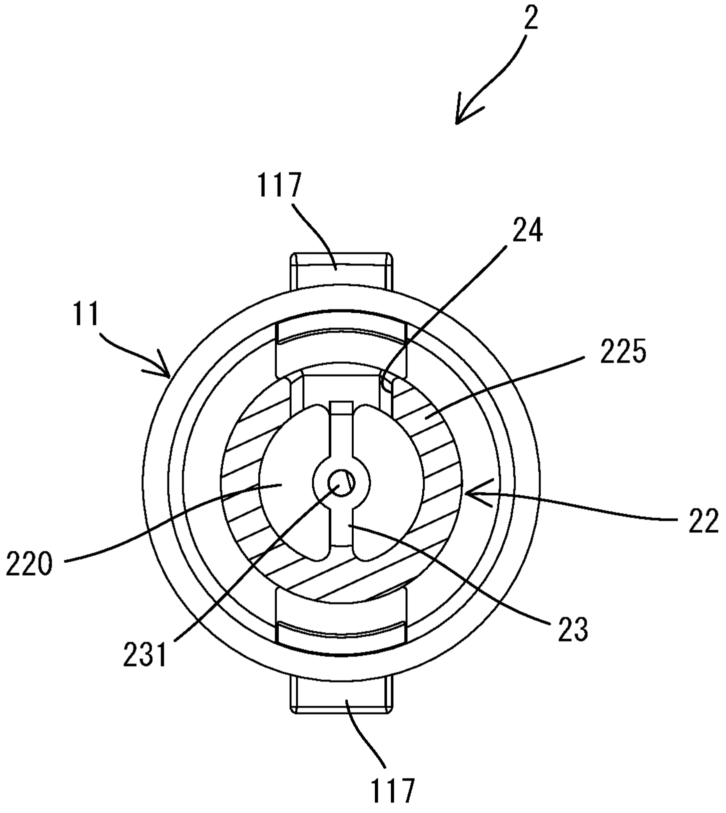
FIG. 26 is a sectional view taken along line XXVI-XXVI in FIG. 25.
Figure 27:
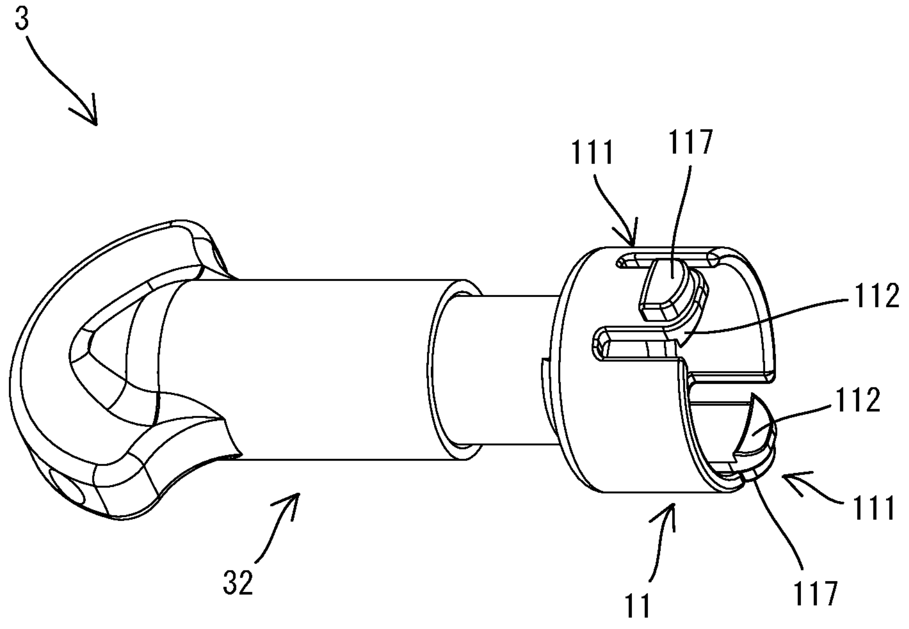
FIG. 27 is a perspective view of another nozzle.
Figure 28:
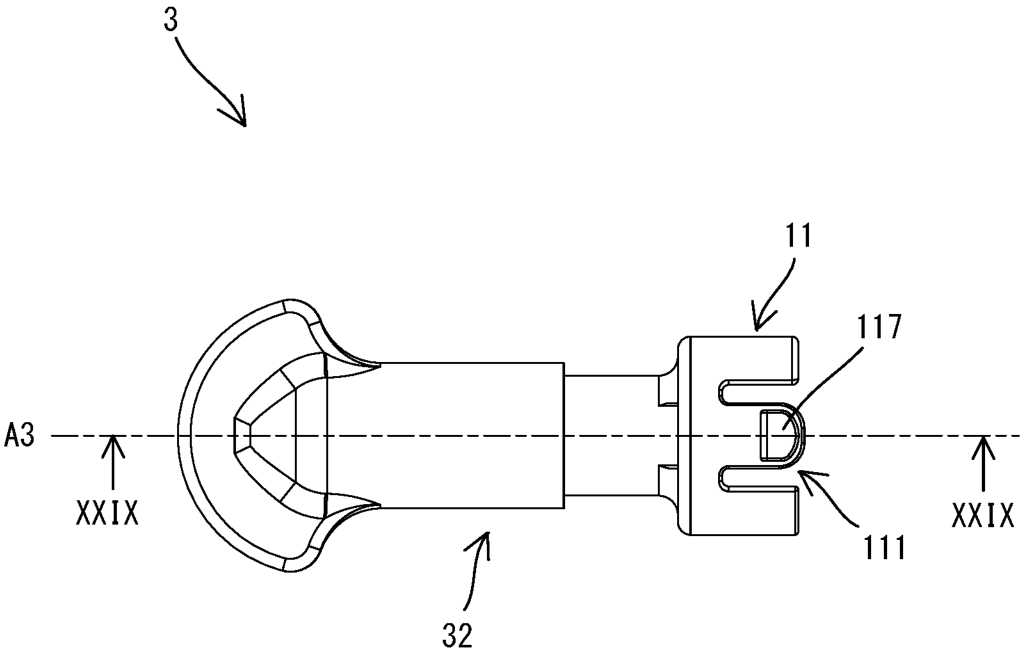
FIG. 28 is a side view of the nozzle.
Figure 29:
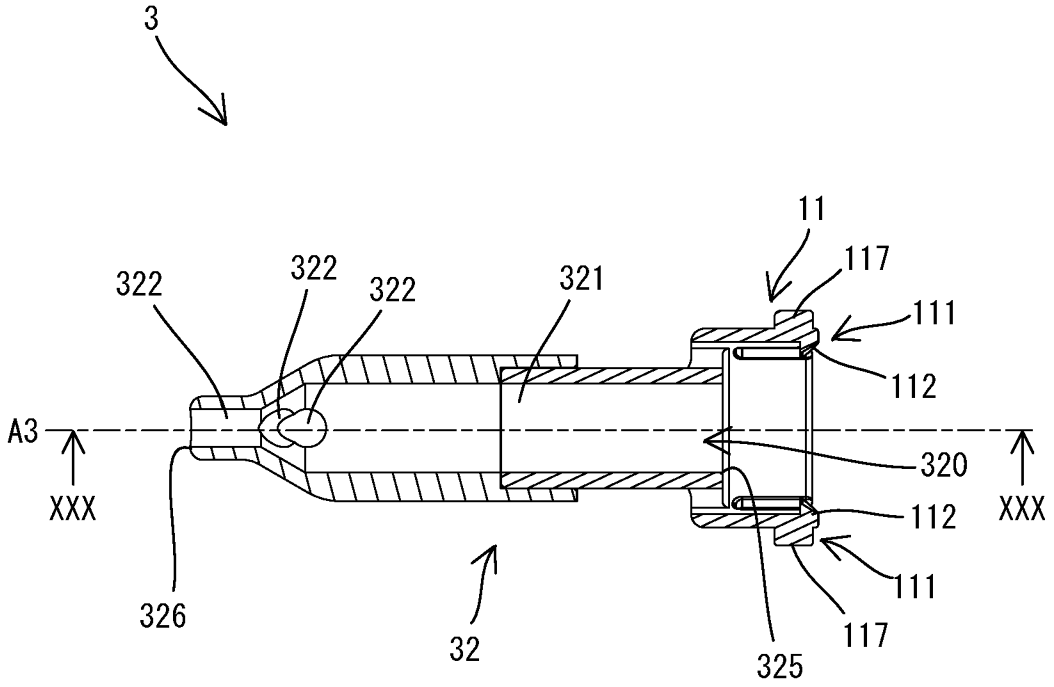
FIG. 29 is a sectional view taken along line XXIX-XXIX in FIG. 28.
Figure 30:
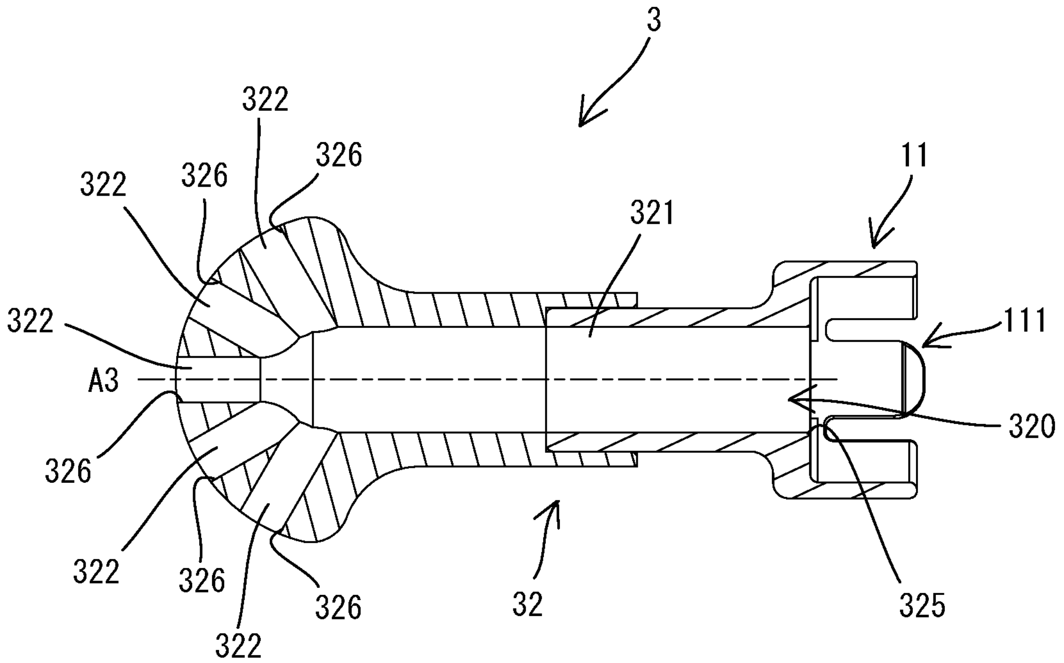
FIG. 30 is a sectional view taken along line XXX-XXX in FIG. 29.

The nozzle 2 of this embodiment has a structure that is suitable for injecting air into an air injection projection (also called an air injection valve or an air plug) formed on an inflatable object. The inflatable object refers, for example, to an article (such as a float, a beach ball and an air mattress) to be inflated with air for use. FIG. 22 shows an example of a general air injection projection 280 having a known structure. As shown in FIG. 22, the projection 280 is formed as a hollow cylinder and defines a passage 281 for providing communication between the inside and outside of a bag-shaped object 28. The projection 280 has an outer diameter of about 9.5 mm and an inner diameter of about 6.5 mm.

The projection 280 protrudes outward from an outer surface of the object 28. A plug 285 for closing an opening (hereinafter referred to as an inlet opening 282) of the passage 281 is connected to an end (protruding end) of the projection 280 outside the object 28. Further, a valve 287 is connected to the other end of the projection 280 inside the object 28. The valve 287 is configured to close an inside opening (hereinafter referred to as an outlet opening 283) of the passage 281 by the air pressure inside the object 28. The projection 280, the plug 285 and the valve 287 are integrally formed of flexible synthetic resin (polymer), such as PVC.

As shown in FIGS. 23 to 26, the nozzle 2 includes the mounting part 11 configured to be attached to the nozzle part 82 (specifically, the lock mechanism 9) of the air duster body 8, and a body part 22 connected to the mounting part 11. The mounting part 11 and the body part 22 are integrally formed of synthetic resin (polymer).

The body part 22 protrudes forward along an axis A2 of the nozzle 2 from a front end of the mounting part 11. The body part 22 includes a cylindrical wall (tubular wall) 225. The cylindrical wall 225 defines a passage 220 extending in the front-rear direction along the axis A2. Although not shown in detail, when the nozzle 2 is attached to the air duster body 8, air blown out by the centrifugal fan 885 of the air duster body 8 flows into the nozzle 2 from a rear end opening of the cylindrical wall 225 (a rear end inlet opening of the passage 220), flows through the passage 220, and is discharged from a front end opening of the cylindrical wall 225 (a front end outlet opening of the passage 220). The rear end opening and the front end opening of the cylindrical wall 225 are hereinafter referred to as an inlet opening 221 and a discharge opening 222, respectively. A front end portion of the passage 220 and the discharge opening 222 have a diameter of 10.0 mm.

Further, a stopper 23 is provided within the cylindrical wall 225. The stopper 23 is configured to define the position of the protruding end of the projection 280 (i.e. an amount of insertion of the projection 280) when the projection 280 is inserted into the cylindrical wall 225. More specifically, the stopper 23 is a wall portion that contains the axis A2 and is connected to an inner peripheral surface of the cylindrical wall 225 across the passage 220. A front end of the stopper 23 is located rearward of a front end of the cylindrical wall 225. Thus, as shown in FIG. 22, the projection 280 can be inserted into the passage 220 through the discharge opening 222 up to a position where the protruding end of the projection 280 abuts on (contacts) the stopper 23. A pin 231 is fixed to the stopper 23. The pin 231 protrudes forward of the discharge opening 222, so that the pin 231 abuts on (contacts) the valve 287 of the projection 280 and open the valve 287 when the projection 280 is inserted into the passage 220. The pin 231 may however be omitted.

As shown in FIGS. 22 to 26, a vent hole (a vent opening) 24 is formed in the cylindrical wall 225. The vent hole 24 is an opening that extends through the cylindrical wall 225 to provide communication between the inside (the passage 220) and outside of the cylindrical wall 225. The vent hole 24 extends from a position rearward of (from a position closer to the mounting part 11 than) the front end of the stopper 23 to the front end of the cylindrical wall 225 in the axial direction of the cylindrical wall 225, such that the vent hole 24 communicates (is connected, is continuous) with the discharge opening 222. In other words, the vent hole 24 is an opening that extends rearward from the front end of the cylindrical wall 225 to a position rearward of the front end of the stopper 23.

With such a structure, when the projection 280 is inserted into the passage 220 through the discharge opening 222, a side surface of the projection 280 closes a portion of the vent hole 24, which portion extends from the front end of the cylindrical wall 225 to a position corresponding to the front end of the stopper 23. At this time, the passage 220 communicates with the outside of the cylindrical wall 225 through a remaining portion of the vent hole 24, which portion extends rearward of the position corresponding to the front end of the stopper 23.

In this embodiment, the air is supplied into the object 28 with the projection 280 fitted into the front end portion of the passage 220. The diameter of the passage 220 and the discharge opening 222 of the nozzle 2 is 10.0 mm, while the inner diameter of the projection 280 (the diameter of the discharge opening 283 of the passage 281) is 6.5 mm, which is smaller than 10.0 mm. Further, it is known that, when the air duster body 8 is operated with a piping that has a discharge opening having a diameter of 6.5 mm, the flow rate of air is within the surge region. Therefore, if the nozzle 2 is attached to the air duster body 8 and the air is blown out only into the projection 280, surge may occur.

Accordingly, in this embodiment, like in the above-described embodiment, the vent hole 24 is configured to have a function of preventing surge. The vent hole 24 is configured to increase the total flow rate of the air discharged from the discharge opening 283 of the passage 281 of the projection 280 and the air discharged from the vent hole 24, such that the total flow rate is outside the surge region, thereby preventing surge. Specifically, the above-described total flow rate of the air is set to be outside the surge region by properly setting the area of the portion of the vent hole 24 that is not closed by the projection 280 (that is, the portion extending rearward of the stopper 23).

Thus, when the air duster 1 is operated, the air flows into the passage 220, passes through the projection 280 inserted through the discharge opening 222 and enters into the object 28. The air also flows out of the passage 220 through the vent hole 24. Surge does not occur at this time.

As described above, in this embodiment, the nozzle 2 can be used with the air duster 8 to supply air to an article via an air injection projection. The nozzle 2 can thus improve convenience of the air duster 8. Further, owing to the vent hole 24, in addition to the discharge opening 222 configured to receive the projection 280, the nozzle 2 can reduce the possibility of occurrence of surge. In the nozzle 2, the stopper 23 defines the amount of insertion of the projection 280 into the passage 220 and prevents the projection 280 from completely closing the vent hole 24, thereby reliably preventing surge. It is noted that the stopper 23 may be a simple projection, or may be omitted.

Third Embodiment

A nozzle 3 according to a third embodiment of the present disclosure is described with reference to FIGS. 27 to 30. The nozzle 3 is another example of the nozzles that can be attached to the air duster 8. The nozzle 3 according to this embodiment has a structure that is suitable for blowing air to a wide range.

As shown in FIGS. 27 to 30, the nozzle 3 includes the mounting part 11 configured to be attached to the nozzle part 82 (specifically, the lock mechanism 9) of the air duster 8, and a body part 32 connected to the mounting part 11.

The body part 32 protrudes forward along an axis A3 of the nozzle 3 from a front end of the mounting part 11. A large portion of the body part 32, including its rear end portion, has a hollow cylindrical shape. A front end portion of the body part 32 is shaped like a fan having a thickness. In this embodiment, a rear half of the body part 32 is formed integrally with the mounting part 11 by synthetic resin (polymer). A front half of the body part 32 is formed of synthetic resin (polymer), separately from the rear half, and press-fitted and connected to the rear half. However, the front and rear halves of the body part 32 may be integrally formed and connected to the mounting part 11, or an entirety of the body part 32 may be integrally formed with the mounting part 11.

The body part 32 has a single inlet opening 325 and five discharge openings 326. The inlet opening 325 is formed at a rear end of the body part 32 and located on the axis A3. The inlet opening 325 is a circular opening. The five discharge openings 326 are formed in the fan-shaped front end portion of the body part 32. The discharge openings 326 spaced apart from each other. Each of the discharge openings 326 is a circular opening.

A passage 320 extends from the inlet opening 325 to the five discharge openings 326. The passage 320 includes a main passage 321 and five branch passages 322. The main passage 321 extends forward from the inlet opening 325 along the axis A3 of the nozzle 3. The main passage 321 has a circular section and has a uniform diameter. Each of the branch passages 322 has a circular section and has a uniform diameter that is smaller than that of the main passage 321. The five branch passages 322 branch from a front end of the main passage 321 and respectively lead to the five discharge openings 326. The five branch passages 322 have the same diameter. Axes of the branch passages 322 all extend in the same plane that contains the axis A3 of the nozzle 3. Thus, this plane intersects all of the five branch passages 322 and the discharge openings 326. The middle one of the five branch passages 322 extends along the axis A3. The axes of the two of the branch passages 322 on the opposite ends (that are farthest apart from each other) form an angle of 120 degrees on the above-described plane that contains the axis A3 of the nozzle 3.

The five discharge openings 326 all have the same diameter. Each of the discharge openings 326 has its center on the above-described plane that contains the axis A3 of the nozzle 3. The center of the middle discharge opening 326 is on the axis A3. The centers of the discharge openings 326 are arranged substantially at equal intervals.

The diameter of the discharge opening 326 is smaller than the diameter of the discharge opening 820 of the air duster 8. However, the ratio of the total area of the five discharge openings 326 to the area of the discharge opening 820 (see FIG. 1) of the air duster 8 is relatively high, so that the total flow rate of air discharged from the discharge openings 326 is outside a surge region. Accordingly, a vent hole for preventing surge is not particularly provided in the nozzle 3.

When the air duster 8 operates, the air flows into the nozzle 3 from the inlet opening 325, flows through the main passage 321 and the five branch passages 322, and is discharged from the five discharge openings 326. Thus, the nozzle 3 is capable of blowing the air to a relatively wide range. Particularly, the five discharge openings 326 are intersected by the same plane and oriented in different directions from each other. Thus, the nozzle 3 is capable of blowing the air to a relatively wide range along this plane, while suppressing a size increase of the nozzle 2 in a direction that is orthogonal to this plane.

Fourth Embodiment

A nozzle 4 according to a fourth embodiment of the present disclosure is described with reference to FIGS. 31 and 32. The nozzle 4 is another example of the nozzles that can be attached to the air duster 8. The nozzle 4 according to this embodiment is different from the nozzle 1 (see FIGS. 7 and 8) according to the first embodiment in the structure of connecting the flexible tube 16 and the base member 10. The nozzle 4 is substantially identical to the nozzle 1 except for this difference.

Figure 31:
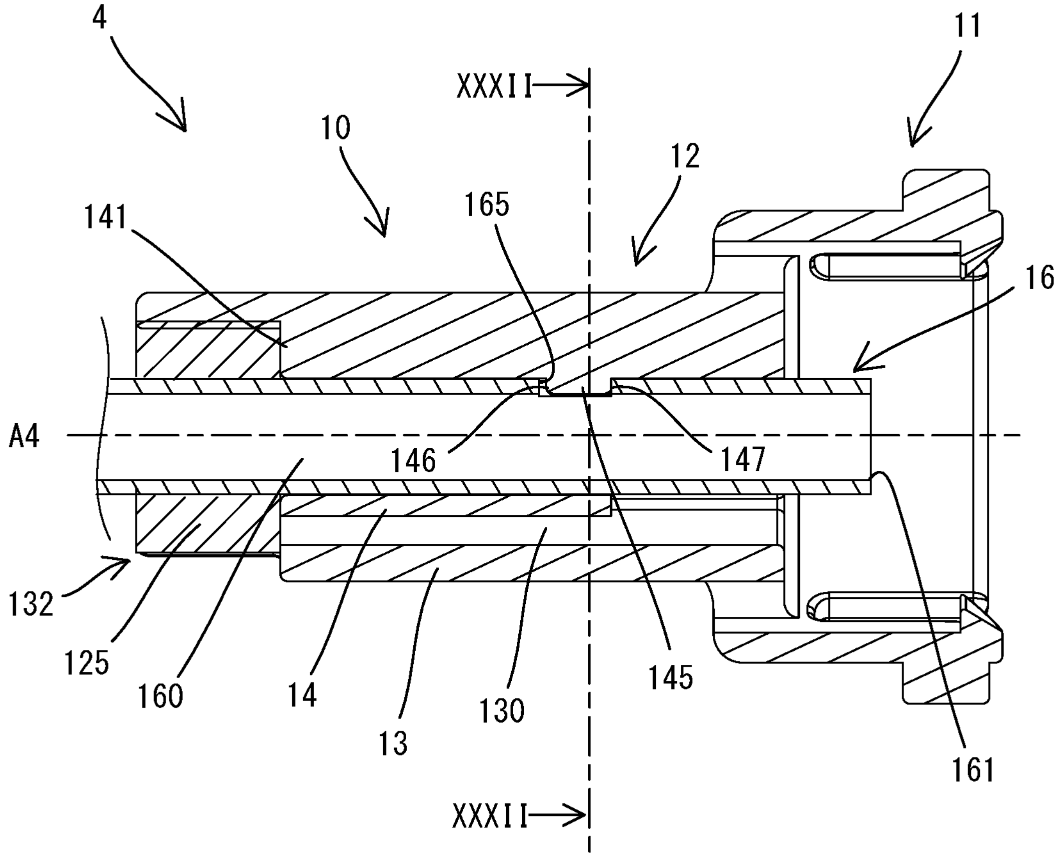
FIG. 31 is a partial, sectional view of another nozzle.
Figure 32:
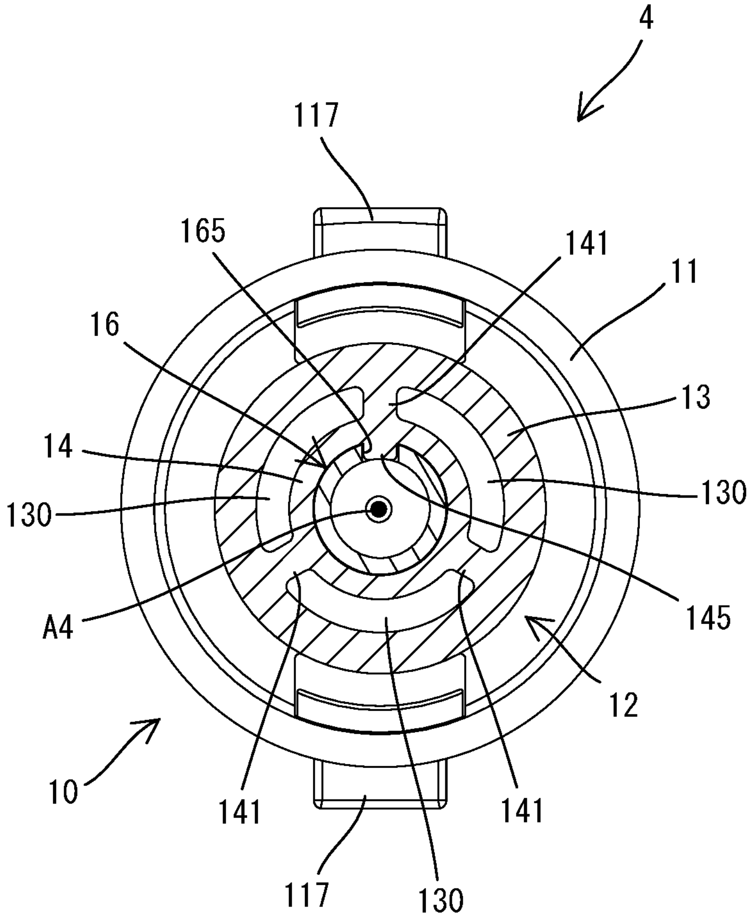
FIG. 32 is a sectional view taken along line XXXII-XXXII in FIG. 31.

As shown in FIGS. 31 and 32, like the nozzle 1, the nozzle 4 includes the base member 10, which includes the mounting part 11 and the holding part 12, and the flexible tube 16 coupled (connected) to the base member 10. The holding part 12 includes the outer tube 13 and the inner tube 14 coupled (connected) to the outer tube 13 via the ribs 141. In this embodiment, a locking projection 145 is formed on a rear end portion of the inner tube 14. The locking projection 145 protrudes radially inward from an inner peripheral surface of the inner tube 14. The locking projection 145 has a generally rectangular shape and is generally parallel to an axis A4 of the nozzle 4. The locking projection 145 has a front end surface formed as a gently curved surface 146 and a rear end surface formed as an orthogonal surface 147 that extends substantially orthogonal to the axis A4. In this embodiment, only one such locking projection 145 is formed in the same position as one of the three ribs 141 in the circumferential direction around the axis A4.

In this embodiment, a locking hole 165 is formed in the flexible tube 16 (i.e. a tube wall), instead of the engagement member 17 fitted around the flexible tube 16. The locking hole 165 is a through hole in which the locking projection 145 can be fitted. More specifically, the locking hole 165 has a rectangular shape having substantially the same width in the circumferential direction as the locking projection 145 and having a slightly longer length in the front-rear direction than the locking projection 145.

When assembling the nozzle 4, the locking hole 165 and the locking projection 145 are aligned with each other in the circumferential direction and then the flexible tube 16 is inserted into the inner tube 14 from the front of the base member 10. Then, owing to the curved surface 146, which is the front end surface of the locking projection 145, the rear end of the flexible tube 16 elastically deforms when the rear end comes into contact with the curved surface 146 and is smoothly moved rearward of the locking projection 145. When the flexible tube 16 is placed in (at) a position where the locking hole 165 faces the locking projection 145, the locking projection 145 fits in the locking hole 165, so that the flexible tube 16 is connected to the base member 10 (the holding part 12). The position of the locking hole 165 in the length direction of the flexible tube 16 is set such that the base end portion of the flexible tube 16 protrudes rearward from the rear end of the outer tube 13 when the flexible tube 16 is connected to the base member 10.

As described above, like the nozzle 1 according to the first embodiment, the nozzle 4 according to this embodiment is configured such that the position and orientation of the discharge opening 162 relative to the air duster 8 can be relatively freely changed. Further, having a smaller number of components than the nozzle 1, the nozzle 4 is less expensive and easier to assemble. Moreover, the orthogonal surface 147, which is the rear end surface of the locking projection 145, can effectively reduce the possibility that the flexible tube 16 comes off forward from the holding member 12 (the base member 10) due to discharge of the air.

Fifth Embodiment

A nozzle 5 according to a fifth embodiment of the present disclosure is described with reference to FIG. 33. The nozzle 5 is another example of the nozzles that can be attached to the air duster 8. The nozzle 5 is partially different from the nozzle 1 (see FIG. 4) according to the first embodiment in the structure of the base member 10 and the structure of connecting the flexible tube 16 and the base member 10. Further, the nozzle 5 is slightly different from the nozzle 4 (see FIG. 31) according to the fourth embodiment in the structure of connecting the flexible tube 16 and the base member 10. The nozzle 5 is substantially identical to the nozzle 1 or the nozzle 4, except for these points.

Figure 33:
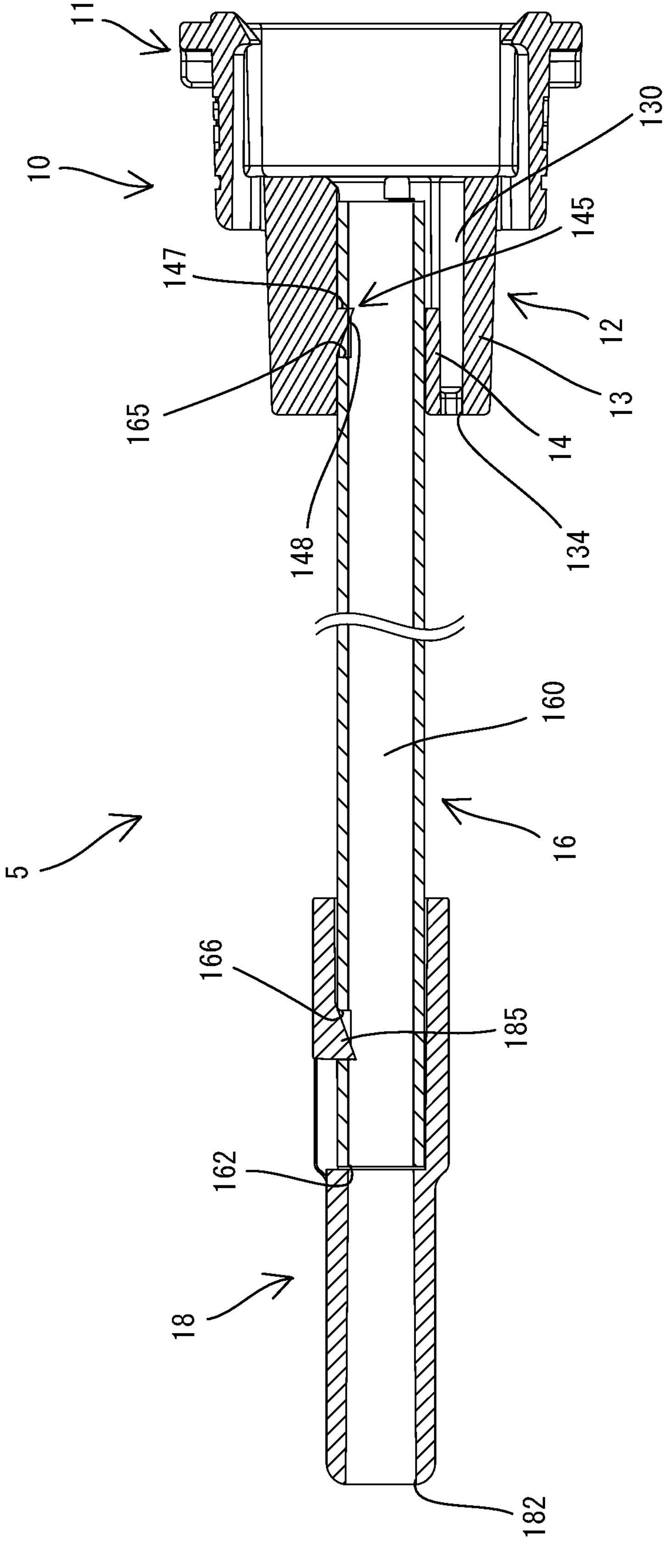
FIG. 33 is a sectional view of another nozzle.

As shown in FIG. 33, the nozzle 5 includes the base member 10, which includes the mounting part 11 and the holding part 12, and the flexible tube 16 connected to the base member 10. In this embodiment, however, the ventilation resistance member 125 (see FIG. 4) is not provided in the vent passage 130 for suppressing surge that is formed between the outer tube 13 and the inner tube 14 of the holding part 12. Air passes through the vent passage 130, and flows out forward from the opening 134.

In this embodiment, like in the fourth embodiment, the base member 10 and the flexible tube 16 are removably connected to each other by engagement between the locking projection 145 and the locking hole 165. The front end surface of the locking projection 145 is, however, an inclined surface 148 that is gently inclined radially inward toward the rear.

Further, in this embodiment, the cover 18 and the flexible tube 16 are removably coupled (connected) to each other by a connecting structure that is similar to the structure of connecting the base member 10 and the flexible tube 16. More specifically, the elongate hollow cylindrical cover 18 has a locking projection 185. The locking projection 185 protrudes radially inward from an inner peripheral surface of the cover 18. A rear end surface (a surface that faces the base member 10) of the locking projection 185 is gently inclined radially outward toward the rear (in a direction toward the base member 10). A front end surface of the locking projection 185 extends substantially orthogonal to the axis of the cover 18. Thus, the cover 18 can also be connected (coupled) to the flexible tube 16 in a manner that is similar to the manner of connecting the base member 10 to the flexible tube 16.

In this embodiment, the discharge opening 162 of the flexible tube 16 is disposed inside the cover 18, and the air discharged from the air duster 8 passes through the flexible tube 16 and the cover 18, and is discharged from a front end opening (discharge opening) 182 of the cover 18.

As described above, in this embodiment, the nozzle 5 can facilitate connecting the base member 10 and the flexible tube 16 and also connecting the cover 18 and the flexible tube 16.

Sixth Embodiment

A nozzle 6 according to a sixth embodiment of the present disclosure is described with reference to FIGS. 34 to 36. The nozzle 6 is another example of the nozzles that can be attached to the air duster 8. The nozzle 6 includes a plurality of tubular members that are removably connected (coupled) to each other. The nozzle 6 is configured such that a user can adjust the length of the nozzle 6 by removing at least one of the tubular members according to the actual usage.

Figure 34:
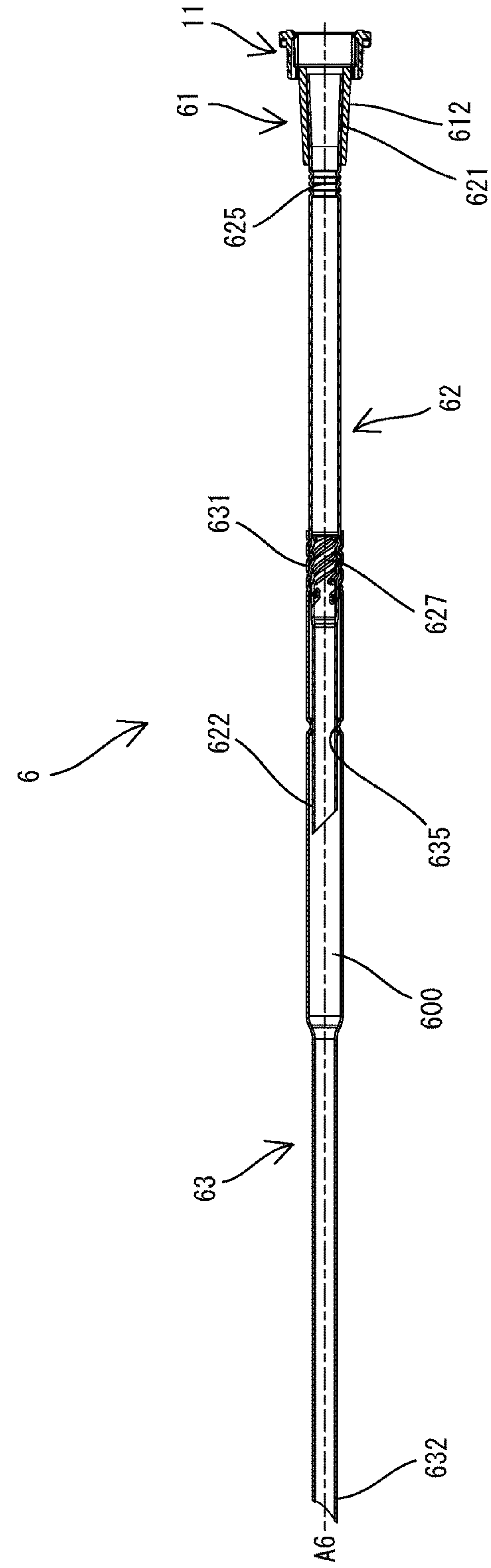
FIG. 34 is a sectional view of another nozzle.

As shown in FIG. 34, the nozzle 6 includes a first member 61 configured to be attached to the air duster 8, a second member 62 removably connected (coupled) to the first member 61, and a third member 63 removably connected (coupled) to the second member 62. A passage 600 is formed inside the nozzle 6 and extends from the first member 61 to a front end of the third member 63 via the second member 62. When the nozzle 6 is used with the air duster 8, air discharged from the air duster 8 flows through the passage 600.

Figure 35:
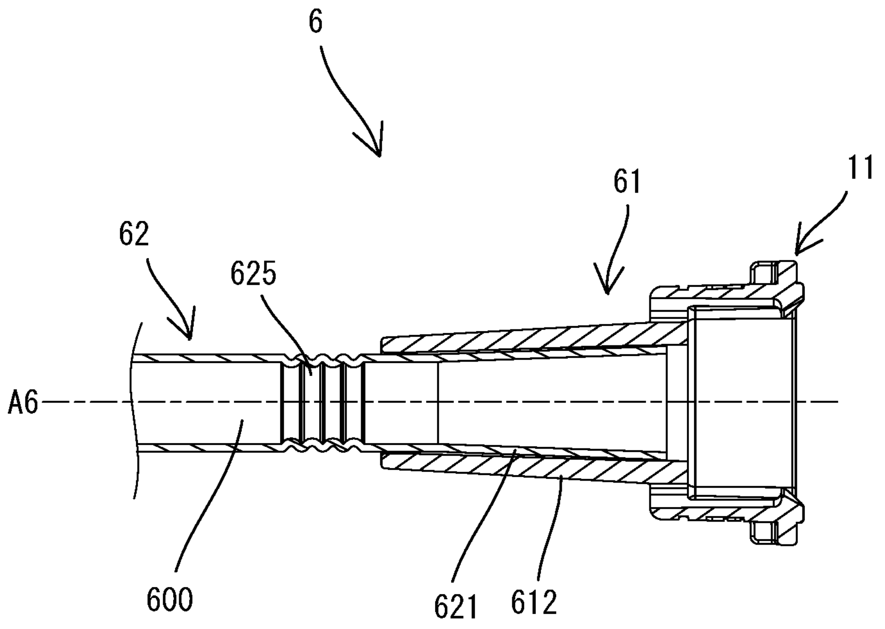
FIG. 35 is a partial, enlarged view of FIG. 34.

As shown in FIGS. 34 and 35, the first member 61 is a tubular member extending along an axis A6. The first member 61 includes the mounting part 11 configured to be attached to the nozzle part 82 (specifically, the lock mechanism 9; see FIG. 1) of the air duster 8, and a holding part 612 protruding from an axial end of the mounting part 11. The holding part 612 has a hollow conical cylindrical shape having outer and inner diameters gradually decreasing toward a front end (an end opposite to the other end connected to the mounting part 11) of the holding part 612. The first member 61 has an axial length, for example, within a range of 10 to 15 cm.

The first member 61 is formed of synthetic resin (polymer). The first member 61 is rigid that is sufficient not to substantially bend (deflect) even if an external force is applied to the first member 61. Thus, the first member 61 hardly has flexibility. The first member 61 is formed, for example, of fiber-reinforced polyamide.

Figure 36:
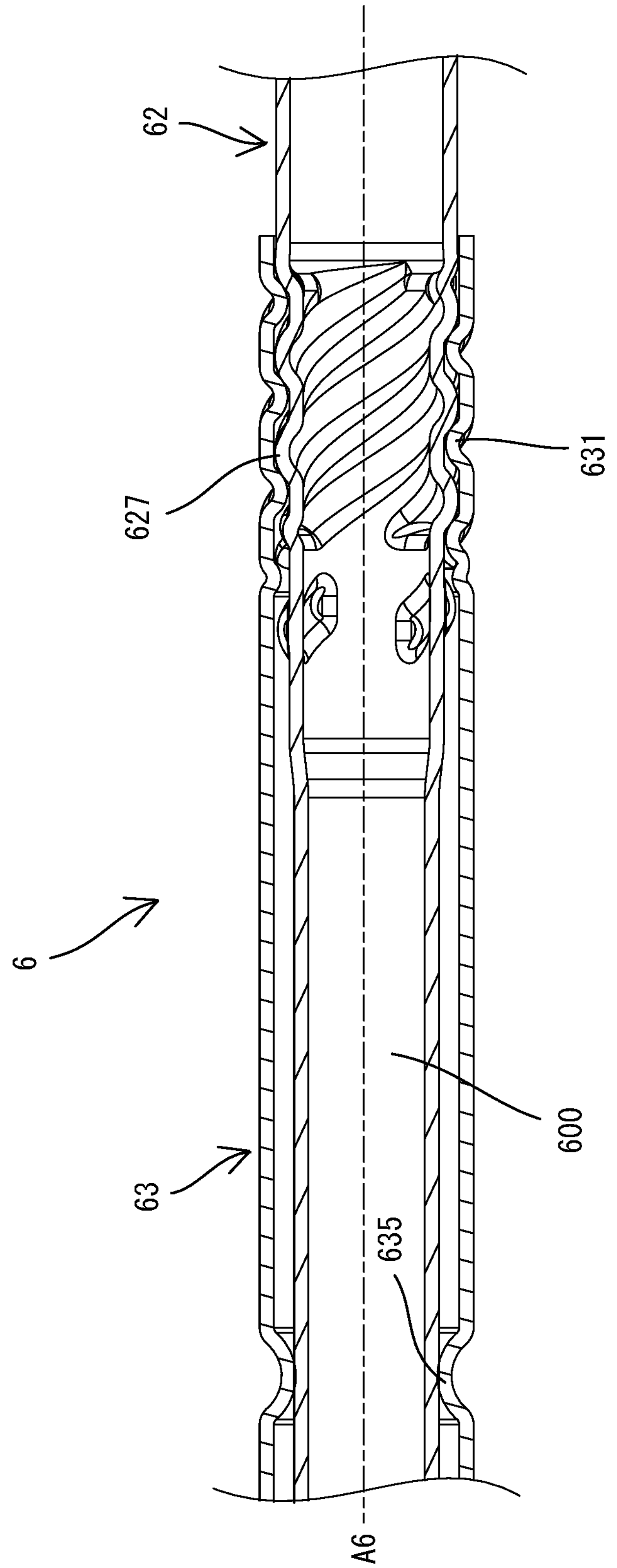
FIG. 36 is another partial, enlarged view of FIG. 34

As shown in FIGS. 34 to 36, the second member 62 is an elongate tubular member. The second member 62 has a length, for example, within a range of 30 to 40 cm. The second member 62 is molded from synthetic resin (e.g. polyethylene). An end portion of the second member 62 in its longitudinal direction is removably connected (coupled) to the first member 61 (specifically, to the holding part 612). The end portion connected to the first member 61 and the other (opposite) end portion of the second member 62 are hereinafter referred to as a base end portion 621 and a leading end portion 622, respectively. The base end portion 621 of the second member 62 has a hollow conical cylindrical shape having outer and inner diameters gradually decreasing toward the leading end portion 622. The base end portion 621 has a shape that conforms to (matches) the holding part 612.

The second member 62 is connected (coupled) to the first member 61, with the base end portion 621 being fitted into the holding part 612. A remaining portion of the second member 62 other than the base end portion 621 protrudes forward from the first member 61. The holding part 612 and the base end portion 621 each have a hollow conical cylindrical shape as described above, so that the base end portion 621 cannot move forward from a specified position relative to the first member 61. When the base end portion 621 is located in (at) the specified position, a rear end of the base end portion 621 (a rear end of the second member 62) is located within a rear end portion of the holding part 612. Although not shown in detail, when the nozzle 6 is attached to the air duster 8, the front end of the nozzle part 82 of the air duster 8 abuts on (contacts) the rear end of the base end portion 621 in the specified position, and prevents the second member 62 from moving rearward (in a direction to be removed from the first member 61) relative to the first member 61.

A region (a portion) of the second member 62 that is adjacent to the base end portion 621 is formed as a flexible region (flexible portion) 625. This region (portion) adjacent to (in the vicinity of) the base end portion 621 can also be regarded as a region (a portion) that is placed adjacent to the first member 61 in front of the first member 61 (on a downstream side in a flowing direction of the air within the nozzle 6) when the second member 62 is connected to the first member 61. The flexible region 625 is configured to be more flexible (deflectable, bendable) than the other region (a remaining portion) of the second member 62. In this embodiment, an expandable/contractable bellows is formed in the flexible region 625.

Further, as shown in FIGS. 34 and 36, the second member 62 has a male threaded part 627. The male threaded part 62 is formed frontward of a center of the second member 62 in its longitudinal direction. The male threaded part 627 has a spiral ridge extending spirally in the circumferential direction of the second member 62.

As shown in FIGS. 34 and 36, the third member 63 is an elongate tubular member. In this embodiment, the third member 63 has a length, for example, within a range of 30 to 40 cm. The third member 63 is molded from synthetic resin (e.g. polyethylene). An end portion of the third member 63 in its longitudinal direction is removably connected (coupled) to the second member 62. The end portion connected to the second member 62 and the other (opposite) end portion of the third member 63 are hereinafter referred to as a base end portion 631 and a leading end portion 632, respectively. The base end portion 631 of the third member 63 is formed as a female threaded part, and has a spiral recess extending spirally in the circumferential direction of the third member 63. The base end portion (female threaded part) 631 is configured to engage (threadedly engage) with the male threaded part 627 of the second member 62. The third member 63 is thus connected to the second member 62 by threaded engagement between the base end portion (female threaded part) 631 and the male threaded part 627.

A front portion of the second member 62 that extends forward of the male threaded part 627 is within a rear portion of the third member 63 when the third member 63 is connected to the second member 62. This front portion of the second member 62 has an outer diameter smaller than the inner diameter of the rear portion of the third member 63. An annular projection 635 is formed in the rear portion of the third member 63. The projection 635 protrudes radially inward of the third member 63. A protruding end of the projection 635 abuts on (contacts) an outer peripheral surface of the second member 62. The second member 62 is thus held at a position forward of the base end portion (female threaded part) 631 and the male threaded part 627 that are threadedly engaged with each other, such that relative radial movement between the second member 62 and the third member 63 is restricted. The positional relationship between the second member 62 and the third member 63 is thus kept stable.

The length of the above-described nozzle 6 in the extending direction of the axis A6 (in the flowing direction of the air) can be changed by removing the third member 63 from the second member 62 or by removing the second and third members 62 and 63 from the first member 61. The user can thus adjust the length of the nozzle 6, depending on the actual usage.

Specifically, for example, when the user wants to blow off grit, dust etc. out of a hole formed in a floor, the user can use the nozzle 6 with the first, second and third members 61, 62 and 63 connected together. In this case, the whole length of the nozzle 6 is maximized, for example, to about 70 cm. Therefore, the user can blow the air to a desired position (the hole) while hardly stooping. On the other hand, when the user wants to blow the air to a position closer to the user, the user can shorten the whole length of the nozzle 6, for example, to about 35 cm by removing only the third member 63. When the user wants to blow the air to a position further closer to the user, the user can further shorten the whole length of the nozzle 6, for example, to about 10 cm by removing the second and third members 62 and 63. Thus, the nozzle 6 can improve convenience of the air duster 8.

The second member 62 and the third members 63 of the nozzle 6 are connected (couped) with each other by threaded engagement. Thus, the air does not easily leak through the connection between the second member 62 and the third member 63. Further, even if an external force (particularly, an axial external force of pushing the third member 63 into the second member 62) is applied to the nozzle 6, the positional relationship between the second member 62 and the third member 63 does not easily change. Therefore, the user can use the nozzle 6 in a stable state.

Further, the flexible region 625 (the bellows) is provided adjacent to the downstream side of the first member 61 in the flowing direction of the air. In this embodiment, the remaining portion of the second member 62 other than the flexible region 625, and the third member 63 are both less rigid than the first member 61 and allow slight deformation or deflection. Owing to provision of the flexible region 625 that is more flexible than the other portions (remaining portion) of the nozzle 6, however, even if an external force (particularly, an external force in a direction crossing the axis A6) is applied to the nozzle 6, the flexible region 625 deflects (bends) and thus reduces a load on the other portions. Particularly, if the flexible region 625 is not provided, the second member 62 may be broken at a boundary between the second member 62 and the front end of the first member 61 attached to the air duster 8. Provision of the flexible region 625 can effectively reduce such a possibility of breakage.

Correspondences between the features of the above-described embodiments and the features of the disclosure are as follows. The features of the above-described embodiments are merely exemplary and do not limit the features of the present disclosure.

The air duster 8 is an example of the “blower”. Each of the nozzles 1, 4, and 5 is an example of the “nozzle”. The mounting part 11 is an example of the “mounting part”. The holding part 12 and the flexible tube 16 together forms an example of the “body part”. The discharge opening 162 is an example of the “discharge opening”. The passage 160 is an example of the “passage”. The flexible tube 16 is an example of the “flexible tube”. The cover 18 is an example of the “cover”. The vent hole (vent opening) 132 is an example of the “vent hole (vent opening)”. The ventilation resistance member 125 is an example of the “ventilation resistance member”. The outer tube 13 is an example of the “first tubular part”. The vent passage 130 is an example of the “vent passage”. The inner tube 14 is an example of the “second tubular part”. The locking hole 165 and the locking projection 145 are examples of the “through hole” and the “projection”, respectively.

The nozzle 3 is an example of the “nozzle”. The body part 32 is an example of the “body part”. The discharge opening 326 is an example of the “discharge opening”. The inlet opening 325 and the passage 320 are examples of the “inlet opening” and the “passage”, respectively. The main passage 321 and the branch passage 322 are examples of the “main passage” and the “branch passage”, respectively.

The nozzle 6 is an example of the “nozzle”. Each of the first member 61, the second member 62 and the third member 63 is an example of the “tubular member”. The first member 61 and the second member 62 are examples of the “first member” and the “second member”, respectively. The flexible region 625 is an example of the “portion of the second member that is adjacent to the first member on a downstream side of the first member in a flowing direction of air”.

The above-described embodiments are mere examples of the disclosure and a nozzle according to the present disclosure is not limited to the nozzles 1 to 6 of the above-described embodiments. For example, the following modifications may be made. Further, at least one of these modifications may be employed in combination with any one of the nozzles 1 to 6 of the above-described embodiment and the claimed features.

For example, in the nozzle 1 according to the first embodiment, the nozzle 4 according to the fourth embodiment and the nozzle 5 according to the fifth embodiment, the length of the flexible tube 16 need not be 70 cm, but may be shorter or longer. However, it may be preferable that the length of the flexible tube 16 is at least 15 cm or longer, in consideration of the degree of freedom in changing the position and orientation of the discharge opening 162. The diameter of the flexible tube 16 can also be arbitrarily changed. In such a modification in which the flow rate of the air discharged from the discharge opening 162 of the flexible tube 16 alone is outside the surge region, the vent hole 132 can be omitted. The flexible tube 16 may be formed of a flexible material other than PVC.

The structure of connecting the flexible tube 16 and the base member 10 is not limited to those of the above-described embodiments. For example, the projections 174 of the engagement member 17 and the recesses 135 of the base member 10 can be appropriately changed in shape, number and position. Further, the locking hole 165 of the flexible tube 16 and the locking projection 145 of the base member 10 can be appropriately changed in number and position. For example, the flexible tube 16 may be removably fixed to the mounting part 11. The flexible tube 16 does not need to define an entirety of the passage 160. For example, the flexible tube 16 may define only a portion of the passage 160, and another member having substantially no flexibility (or having significantly lower flexibility than the flexible tube 16) may define another portion of the passage 160.

The position, number, shape and area of the vent hole 132, if provided, are not limited to those of the above-described embodiments, but can be arbitrarily determined based on the relationship with the surge region as described above. For example, multiple vent holes 132 having different shapes may be provided. Further, in a case where the speed of the motor 881 of the air duster 8 (i.e. the rotation speed of the centrifugal fan 885) is variable, the characteristic curve differs according to the speed of the motor 881. Therefore, the areas of the discharge opening 162 and the vent hole(s) 132 may preferably be set such that the total flow rate is always outside the surge region whichever speed of the motor 881 is selected within a settable range.

The ventilation resistance member 125 may be omitted or changed in number, position and shape. In such a case, the structure of the vent hole(s) 132 can be changed based on the relationship with the surge region according to the change of the ventilation resistance member 125.

The vent hole 24 of the nozzle 2 according to the second embodiment can also be similarly changed in position, number, shape and area. However, the vent hole 24 is configured such that at least a portion of the vent hole 24 is not closed by the projection 280 when the projection 280 is inserted into the passage 220 through the discharge opening 222. Further, the nozzle 2 may be provided with a ventilation resistance member.

The nozzle 3 according to the third embodiment may have any number of discharge openings 326 of two or more. The discharge openings 326 and the passage 320 can be appropriately changed in position, shape and area. For example, the discharge openings 326 may be spaced apart from each other in the circumferential direction around the axis A3. The discharge openings 326 may be connected to multiple separate passages that respectively extend from multiple inlet openings. Further, in a case where the total flow rate of the air discharged from the modified discharge openings 326 is within the surge region, one or more vent holes may be additionally provided.

The number of the tubular members forming the nozzle 6 according to the sixth embodiment may be two or four or more. Each of the first to third members 61, 62 and 63 may be appropriately changed in shape, length and diameter. The first member 61 and the second member 62 may be removably connected (coupled) to each other by threaded engagement. The flexible region 625 may be formed by a material (e.g. elastomer) that is more elastically deformable than the remaining portion of the nozzle 6, in place of the bellows. The flexible region 625 may be omitted, particularly when the entirety of the nozzle 6 has a certain degree of flexibility.

The structure of connecting the nozzles 1 to 6 and the air duster 8 is not limited to the connecting structure using the mounting part 11 and the lock mechanism 9. For example, the nozzles 1 to 6 and the air duster 8 may be configured to be threadedly engaged with each other.

The electric blower to which the nozzles 1 to 6 are removably attachable is not limited to the air duster 8. For example, the blower may be a multistage centrifugal blower having a plurality of centrifugal fans. An axil fan may be employed in place of the centrifugal fan 885. The power source of the blower may be a disposable battery or an external AC power source. The motor 881 may be an AC motor or a motor with a brush.

Further, in view of the nature of the present disclosure, the above-described embodiments and the modifications thereto, the following aspects are provided. Any one the following aspects can be employed independently, or at least one of the following aspects can be employed in combination with at least one of the above-described embodiments and modifications and the claimed features.

(Aspect 1)

The passage extends from an inlet opening, through which the air blown out by the blower flows in, to the discharge opening.

(Aspect 2)

The flexible tube is coupled (connected) to the mounting part such that the flexible tube is allowed to be pulled out of the mounting part in a direction opposite to the flowing direction of the air.

According to this aspect, a user can replace the flexible tube as necessary.

(Aspect 3)

The nozzle further includes an engagement member coupled to the flexible tube, and the mounting part or the body part has (i) a recess recessed in the flowing direction; or (ii) a projection protruding in a direction opposite to the flowing direction, and the engagement member is fitted to the recess or the projection of the mounting part or the body part.

According to this aspect, the connecting structure that prevents the flexible tube from coming off in the flowing direction of the air can be provided in a simple structure. The engagement member 17 is an example of the "engagement member".

(Aspect 4)

The engagement member is a tubular member having an inner diameter slightly smaller than the flexible tube, and includes a first member and a second member that are put together to abut on each other, and the first and second members are fitted to the recess or the projection with the flexible tube held therebetween.

According to this aspect, the connecting structure for the flexible tube can facilitate assembling of the nozzle. The first member 17A and the second member 17B are examples of the "first member" and the "second member", respectively. The recess 135 is an example of the "recess".

(Aspect 5)

The engagement member has at least one projection protruding radially inward.

According to this aspect, the engagement member can more reliably hold the flexible tube. Each of the ridges 171A, 171B is an example of the "projection".

(Aspect 6)

The at least one vent hole is an opening configured to suppress surge.

According to this aspect, the diameter of the discharge opening can be relatively reduced according to the intended usage.

(Aspect 7)

A flow rate of the air discharged from the discharge opening is within a surge region that is defined according to specifications of the blower, and a total flow rate of the air discharged from the at least one vent hole and the air discharged from the discharge opening is outside the surge region.

According to this aspect, surge can be reliably prevented.

(Aspect 8)

An area of the discharge opening is set such that a flow rate of the air discharged only from the discharge opening is within a surge region that is defined according to specifications of the blower, and a total area of the at least one vent hole and the discharge opening is set such that a total flow rate of the air discharged from the discharge opening and from the at least one vent hole is outside the surge region.

(Aspect 9)

The body part has at least one vent passage extending to the at least one vent hole.

The vent passage 130 is an example of the "vent passage".

(Aspect 10)

The body part includes a first tubular part that is disposed radially outward of the flexible tube, and the at least one vent passage is defined between the first tubular part and the flexible tube.

According to this aspect, the at least one vent passage can be rationally provided. The outer tube 13 is an example of the "first tubular part".

(Aspect 11)

The at least one vent hole includes (i) an annular first opening that is defined between one axial end of the first tubular part and the flexible tube; and (ii) at least one second opening that is formed in a side portion of the first tubular part and that is connected to (communicates with) the annular first opening.

According to this aspect, a rational structure is provided that can increase the area of the at least one vent hole to thereby increase the flow rate of the air discharged from the at least one vent hole. The opening 134 is an example of the "first opening". Each of the openings 137 is an example of the "second opening".

(Aspect 12)

The body part includes a second tubular part that is radially inward of the first tubular part and through which the flexible tube is inserted.

According to this aspect, the at least one vent passage can be provided between the flexible tube and the first tubular part while the flexible tube is stably held by the second tubular part. The inner tube 14 is an example of the "second tubular part".

(Aspect 13)

The ventilation resistance member is configured to reduce a flow velocity (wind velocity) of the air while allowing the air to pass through the ventilation resistance member.

(Aspect 14) The ventilation resistance member is formed as an open-celled foam of synthetic resin (polymer).

(Aspect 15)

The body part has an inlet opening through which the air blown out by the blower flows in, and a passage that extends between the inlet opening and the discharge opening, and a portion of the at least one vent hole is disposed between the mounting part and a tip end of the projection inserted into the passage through the discharge opening, in an axial direction of the body part.

(Aspect 16)

The body part has at least one inlet opening through which air blown out by the blower flows in, and at least one passage that extends between the least one inlet opening and the plurality of the discharge openings.

The inlet opening 325 and the passage 320 are examples of the "inlet opening" and the "passage", respectively.

(Aspect 17)

The at least one inlet opening is a single inlet opening, and the at least one passage includes a main passage that extends from the single inlet opening, and a plurality of branch passages that branch from the main passage and respectively extend to the discharge openings.

According to this aspect, a rational passage arrangement for leading the air to the discharge openings can be provided. The inlet opening 325, the main passage 321 and the branch passage 322 are examples of the "inlet opening", the "main passage" and the "branch passage", respectively.

(Aspect 18)

The mounting part has an elastically deformable locking piece, and the locking piece is configured to, when the nozzle is moved in the first direction relative to the blower, abut on the blower and move while elastically deforming, and when reaching a position facing a locking recess of the blower, engage with the locking recess owing to a restoring force.

According to this aspect, the nozzle can be locked to the blower with a simple structure.

(Aspect 19)

The flexible tube has a through hole formed in a tube wall, and the mounting part or the body part has a projection protruding radially inward of the nozzle and fitted in the through hole of the flexible tube.

According to this aspect, the connecting structure that is easy to assemble can be provided without increasing the number of components. The locking hole 165 and the locking projection 145 are examples of the "through hole" and the "projection", respectively.

(Aspect 20)

A first surface of the projection on an upstream side in the flowing direction of the air is an orthogonal surface that extends substantially orthogonal to an axis of the nozzle, and a second surface of the projection on a downstream side in the flowing direction is a curved or inclined surface.

According to this aspect, a simple connecting structure can be provided that reduces the possibility that the flexible tube comes off in the flowing direction of the air and that facilitates assembling of the nozzle.

(Aspect 21)

A nozzle configured to be attached to an electric blower, the nozzle comprising:

a mounting part configured to be attached to the blower; and a tubular body part protruding from the mounting part and having a discharge opening and at least one vent hole, wherein:

the discharge opening is formed at a protruding end of the body part and configured to receive a tubular air injection projection formed on an inflatable object, and the at least one vent hole is formed in a side portion of the body part and extends to the protruding end of the body part such that the at least one vent hole communicates with the discharge opening.

According to this aspect, the nozzle is provided that is attachable to the blower and that can supply air to the inflatable object via the air injection projection. The nozzle according to this aspect can thus improve convenience of the blower. Further, even when a flow rate of air discharged into the inflatable object from the projection that is inserted through the discharge opening (i.e. air supplied to the inflatable object) is relatively small, air is also discharged from the at least one vent hole. Therefore, the possibility of surge can be reduced. The nozzle 2 is an example of the "nozzle". The mounting part 11 is an example of the "mounting part". The body part 22 is an example of the "body part". The discharge opening 222 is an example of the "discharge opening". The vent hole (vent opening) 24 is an example of the "vent hole (vent opening)". The projection 280 is an example of the "air injection projection".

(Aspect 22)

The nozzle as defined in Aspect 21, wherein:

the body part has a passage extending from an inlet opening, through which air blown out by the blower flows into the body part, to the discharge opening, and a portion of the at least one vent hole is configured to provide communication between an inside and an outside of the passage without being closed by the projection when the projection is inserted into the passage through the discharge opening.

The passage 220 and the inlet opening 221 are examples of the "passage" and the "inlet opening", respectively.

(Aspect 23)

The nozzle as defined in Aspect 21, wherein:

a flow rate of the air discharged into the inflatable object from the projection via the discharge opening is within a surge region that is defined according to specifications of the blower, and a total flow rate of the air discharged to the outside of the passage from the portion of the at least one vent hole and the air discharged into the inflatable object from the projection via the discharge opening is outside the surge region.

(Aspect 24)

The nozzle as defined in Aspect 21, wherein:

a stopper is provided inside the body part and configured to abut on the projection when the projection is inserted into the body part through the discharge opening, and a length of the at least one vent hole in an axial direction of the body part is longer than a distance from the discharge opening to the stopper in the axial direction of the body part.

According to this embodiment, even when the air injection projection is inserted into the body part through the discharge opening, air can reliably flow out of the body part through the at least one vent hole. The stopper 23 is an example of the "stopper".

DESCRIPTION OF THE REFERENCE NUMERALS

1: nozzle, 10: base member, 11: mounting part, 111: locking piece, 112: claw, 113: front end surface, 114: rear end surface, 115: inclined surface, 117: actuation projection, 118: rear end surface, 12: holding part, 125: ventilation resistance member, 13: outer tube, 130: vent passage, 131: inlet opening, 132: vent hole, 134: opening, 135: recess, 137: opening, 14: inner tube, 141: rib, 145: locking projection, 146: curved surface, 147: orthogonal surface, 148: inclined surface, 16: flexible tube, 160: passage, 161: inlet opening, 162: discharge opening, 165: locking hole, 166: locking hole, 17: engagement member, 17A: first member, 171A: ridge, 17B: second member, 171B: ridge, 174: projection, 175: rear end portion, 18: cover, 185: projection, 2: nozzle, 22: body part, 220: passage, 221: inlet opening, 222: discharge opening, 225: cylindrical wall, 23: stopper, 231: pin, 24: vent hole, 28: object, 280: projection, 281: passage, 282: inlet opening, 283: discharge opening, 285: plug, 287: valve, 3: nozzle, 32: body part, 320: passage, 321: main passage, 322: branch passage, 325: inlet opening, 326: discharge opening, 4: nozzle, 5: nozzle, 6: nozzle, 600: passage, 61: first member, 612: holding part, 62: second member, 621: base end portion, 622: leading end portion, 625: flexible region, 627: male threaded part, 63: third member, 631: base end portion (female threaded part), 632: leading end portion, 635: projection, 8: air duster, 81: body housing, 810: inlet opening, 811: cylindrical part, 813: front cover, 814: shoulder part, 82: nozzle part, 820: discharge opening, 83: handle, 831: trigger, 832: switch, 835: battery, 881: motor, 882: output shaft, 885: centrifugal fan, 89: nut, 9: lock mechanism, 91: lock sleeve, 913: locking groove, 915: guide part, 916: inclined surface, 917: release groove, 93: slide sleeve, 931: spring receiving part, 935: receiving recess, 936: abutment surface, 938: restricting part, 95: biasing spring

What is claimed is:

1. A nozzle configured to be attached to an electric blower, the nozzle comprising:

a mounting part configured to be attached to the blower; and a body part connected to the mounting part and having a discharge opening and a passage for air blown out by the blower, the passage leading to the discharge opening, wherein the body part includes a flexible tube having a length of at least 15 cm and defining at least a portion of the passage, and the body part has at least one vent hole disposed radially outward of the flexible tube.

2. The nozzle as defined in claim 1, wherein the flexible tube is coupled to the mounting part such that the flexible tube is prevented from coming off from the mounting part in a flowing direction of the air.

3. The nozzle as defined in claim 1, further comprising:

a cover that at least partially covers the flexible tube, wherein the cover is formed of a material having higher rigidity than the flexible tube and removably coupled to the flexible tube.

4. The nozzle as defined in claim 1, wherein:

a flow rate of the air discharged from the discharge opening is within a surge region that is defined according to specifications of the blower, and a total flow rate of the air discharged from the at least one vent hole and the air discharged from the discharge opening is outside the surge region.

5. The nozzle as defined in claim 1, further comprising:

a ventilation resistance member disposed in a vent passage leading to the at least one vent hole.

6. The nozzle as defined in claim 1, wherein:

the body part includes a first tubular part disposed radially outward of the flexible tube, and a vent passage leading to the at least one vent hole is defined between the first tubular part and the flexible tube.

7. The nozzle as defined in claim 6, wherein the body part includes a second tubular part that is disposed radially inward of the first tubular part and through which the flexible tube is inserted.

8. The nozzle as defined in claim 1, wherein the mounting part is configured to be locked in an attachment position, when the nozzle is moved in a first direction and placed in the attachment position relative to the blower, to be immovable in a second direction opposite to the first direction relative to the blower.

9. A nozzle configured to be attached to an electric blower, the nozzle comprising:

a mounting part configured to be attached to the blower; and a body part connected to the mounting part and having a discharge opening and a passage for air blown out by the blower, the passage leading to the discharge opening, wherein the body part includes a flexible tube having a length of at least 15 cm and defining at least a portion of the passage, the flexible tube has a through hole, and the mounting part or the body part has a projection protruding radially inward of the nozzle and fitted in the through hole of the flexible tube.

10. The nozzle as defined in claim 9, wherein the flexible tube is coupled to the mounting part such that the flexible tube is prevented from coming off from the mounting part in a flowing direction of the air.

11. The nozzle as defined in claim 9, further comprising:

a cover that at least partially covers the flexible tube, wherein the cover is formed of a material having higher rigidity than the flexible tube and removably coupled to the flexible tube.

12. The nozzle as defined in claim 9, wherein the body part has at least one vent hole disposed radially outward of the flexible tube.

13. The nozzle as defined in claim 12, wherein:

a flow rate of the air discharged from the discharge opening is within a surge region that is defined according to specifications of the blower, and a total flow rate of the air discharged from the at least one vent hole and the air discharged from the discharge opening is outside the surge region.

14. The nozzle as defined in claim 12 further comprising:

a ventilation resistance member disposed in a vent passage leading to the at least one vent hole.

15. The nozzle as defined in claim 12, wherein:

the body part includes a first tubular part disposed radially outward of the flexible tube, and a vent passage leading to the at least one vent hole is defined between the first tubular part and the flexible tube.

16. The nozzle as defined in claim 15, wherein the body part includes a second tubular part that is disposed radially inward of the first tubular part and through which the flexible tube is inserted.

17. The nozzle as defined in claim 12, wherein the mounting part is configured to be locked in an attachment position, when the nozzle is moved in a first direction and placed in the attachment position relative to the blower, to be immovable in a second direction opposite to the first direction relative to the blower.

18. A nozzle configured to be attached to an electric air duster configured to blow off grit and dust by discharging compressed air, the nozzle comprising:

a base member configured to be attached to the air duster;

a flexible tube having a first end portion directly coupled to the base member and a second end portion that is opposite to the first end portion; and a cover removably coupled to the flexible tube, wherein the base member and the flexible tube define a passage for the compressed air supplied by the air duster, the flexible tube has a length of at least 15 cm, the cover covers the second end portion of the flexible tube and defines a discharge opening configured to discharge the compressed air outside the nozzle, the cover is formed of a material having higher rigidity than the flexible tube and configured to keep the second end portion of the flexible tube unbendable while the cover is manipulated by a user, the cover is fitted around the flexible tube, and an inner peripheral surface of the cover is subjected to non-slip processing to suppress slippage of the flexible tube.

19. The nozzle as defined in claim 18, wherein the flexible tube has a through hole, and the cover has a projection protruding radially inward of the cover and fitted in the through hole of the flexible tube.

* * * * *